US009799161B2

(12) United States Patent
Froy

(10) Patent No.: US 9,799,161 B2
(45) Date of Patent: Oct. 24, 2017

(54) ENHANCED ELECTRONIC GAMING MACHINE WITH GAZE-AWARE 3D AVATAR

(71) Applicant: IGT CANADA SOLUTIONS ULC, Moncton (CA)

(72) Inventor: David Froy, Lakeville-Westmorland (CA)

(73) Assignee: IGT CANADA SOLUTIONS ULC, Moncton (CA)

( * ) Notice: Subject to any disclaimer, the term of this patent is extended or adjusted under 35 U.S.C. 154(b) by 0 days.

(21) Appl. No.: 14/966,762

(22) Filed: Dec. 11, 2015

(65) Prior Publication Data

US 2017/0169659 A1 Jun. 15, 2017

(51) Int. Cl.
*A63F 13/00* (2014.01)
*G07F 17/32* (2006.01)

(52) U.S. Cl.
CPC ...... *G07F 17/3227* (2013.01); *G07F 17/3211* (2013.01); *G07F 17/3244* (2013.01)

(58) Field of Classification Search
None
See application file for complete search history.

(56) References Cited

U.S. PATENT DOCUMENTS 6,222,465 B1 4/2001 Kumar et al.
7,293,235 B1 * 11/2007 Powers .................... G06T 7/20 463/1
7,815,507 B2 10/2010 Parrott et al.
2012/0115594 A1 * 5/2012 Hornik .................... G07F 17/34 463/27
2012/0256967 A1 * 10/2012 Baldwin ................ G06F 3/013 345/684
2013/0023337 A1 * 1/2013 Bowers ................... G07F 17/32 463/25
2013/0079088 A1 * 3/2013 Lafky ................ G07F 17/3211 463/16
2013/0267317 A1 * 10/2013 Aoki .................. G07F 17/3206 463/32
2014/0323194 A1 * 10/2014 Keilwert ............ G07F 17/3206 463/16
2015/0055808 A1 * 2/2015 Vennstrom ............. G06F 3/167 381/307
2015/0346814 A1 * 12/2015 Thukral ............... G06K 9/0061 345/156
2016/0093136 A1 * 3/2016 Lyons ................ G07F 17/3206 463/21

* cited by examiner

*Primary Examiner* — Jason Yen
(74) *Attorney, Agent, or Firm* — Sage Patent Group

(57) ABSTRACT

A computer device and method for displaying a 3D avatar and causing the 3D avatar to move are provided. The computer device may be an electronic gaming machine, and comprises a camera which can be used to collect data on the movement of a player of an electronic game. The movements of the player may then be analyzed and used to generate avatar movement data for moving the 3D avatar. The 3D avatar may mimic the motions of the player, or may react to the player's motions in complimentary fashion. Additionally, the electronic gaming machine may be networked to other like electronic gaming machines, which may share avatar movement data amongst themselves.

20 Claims, 12 Drawing Sheets

ENHANCED ELECTRONIC GAMING MACHINE WITH GAZE-AWARE 3D AVATAR

TECHNICAL FIELD

The present application is generally drawn to electronic gaming systems, and more specifically to manipulating game components or interface in response to a player's body movements.

BACKGROUND OF THE ART

Many different video gaming systems or machines exist, and may consist of slot machines, online gaming systems (that enable players to play games using computer devices, whether desktop computers, laptops, tablet computers or smart phones), computer programs for use on a computer device (including desktop computer, laptops, tablet computers of smart phones), or gaming consoles that are connectable to a display such as a television or computer screen.

Video gaming machines may be configured to enable players to play a variety of different types of games. One type of game displays a plurality of moving arrangements of gaming elements (such as reels, and symbols on reels), and one or more winning combinations are displayed using a pattern of gaming elements in an arrangement of cells (or an "array"), where each cell may include a gaming element, and where gaming elements may define winning combinations (or a "winning pattern").

Games that are based on winning patterns may be referred to as "pattern games" in this disclosure.

One example of a pattern game is a game that includes spinning reels, where a player wagers on one or more lines, activates the game, and the spinning reels are stopped to show one or more patterns in an array. The game rules may define one or more winning patterns of gaming elements, and these winning patterns may be associated with credits, points or the equivalent.

Another example type of game may be a maze-type game where the player may navigate a virtual character through a maze for prizes.

A further example type of game may be a navigation-type game where a player may navigate a virtual character to attempt to avoid getting hit by some moving or stationary objects and try to contact other moving or stationary objects.

Gaming systems or machines of this type are popular; however, there is a need to compete for the attention of players by innovating with the technology used to implement the games.

SUMMARY

A computer device and method for displaying a 3D avatar and causing the 3D avatar to move are provided. The computer device may be an electronic gaming machine, and comprises a camera which can be used to collect data on the movement of a player of an electronic game. The movements of the player may then be analyzed and used to generate avatar movement data for moving the 3D avatar. The 3D avatar may mimic the motions of the player, or may react to the player's motions in complementary fashion. Additionally, the electronic gaming machine may be networked to other like electronic gaming machines, which may share avatar movement data amongst themselves.

In accordance with a broad aspect, embodiments described herein relate to computer-implemented devices, systems and methods for moving game components that may involve displaying game components using various graphical enhancements. The gaming surface may be provided as a three-dimensional environment with various points of view. The devices, systems and method may involve tracking player movement and updating the three-dimensional point of view based on the tracked player movement. The devices, systems and method may involve tracking player movement and updating three-dimensional objects, virtual characters or avatars, gaming components, or other aspects of the gaming surface in response. For example, the devices, systems and method may involve tracking a player's eyes so that when the eyes move the virtual characters, gaming components, gaming surface, or other object moves in response. The player may navigate virtual characters through a game with body and eye movements. Tracking the player's may manipulate gaming objects based on body and eye movements. The player's movements may also relate to particular gestures.

In accordance with another broad aspect, the graphical enhancement may involve displaying multi-faceted game components as a three-dimensional configuration. The devices, systems and method may involve tracking player movement, including eye movements, and rotating the multi-faceted game components in response to tracked movement. The rotation may be on different axis, such as vertical, horizontal or at an angle to a plane of the game surface or display device. The rotation may enable a player to view facets that may be hidden from a current view. The devices, systems and method may involve tracking player movement and updating the point of view of the graphical enhancement multi-faceted game components in response.

In accordance with a further broad aspect, there may be provided an electronic gaming device. The electronic gaming device may comprise at least one data storage unit to store game data for a game; a display unit to display, via a graphical user interface, graphical game components, including at least one avatar, in accordance with the game data; at least one data capture unit to collect player movement data representative of movement of at least one eye of a player of the game, the data capture device comprising a camera; and at least one processor. The processor may be configured to analyze the player movement data; generate avatar movement data based at least in part on the player movement data, the avatar movement data comprising instructions for causing at least one portion of the at least one avatar to move; and cause movement of the at least one portion of the at least one avatar on the display unit based on the avatar movement data.

In some embodiments, the player movement data is indicative of a gaze of the player, and the avatar movement data comprises instructions for causing at least one portion of the at least one avatar to follow the gaze of the player.

In some embodiments, the at least one portion of the at least one avatar comprises at least one eye of the at least one avatar.

In some embodiments, the player movement data is further representative of movement of a head of the player, and the at least one portion of the at least one avatar comprises at least a head of the at least one avatar.

In some embodiments, the at least one processor is further configured for analyzing at least one facial expression of the player to determine, for each of the at least one facial expression, a respective emotional state of the player.

In some embodiments, the at least one processor is further configured to generate the avatar movement data based on the at least one facial expression of the player.

In some embodiments, the avatar movement data comprises instructions for causing the at least one avatar to mimic the at least one facial expression of the player.

In some embodiments, the avatar movement data comprises instructions for causing the at least one avatar to adopt a facial expression complementary to the at least one emotional state of the player.

In some embodiments, the processor is further configured to predictively generate avatar movement data based on previously acquired player movement data.

In accordance with a further broad aspect, there may be provided a networked electronic gaming device. The networked electronic gaming device comprises at least one data storage unit to store game data for a game; a display unit to display, via a graphical user interface, graphical game components in accordance with the game data; a communication unit for communicating, over a network, with at least one other networked electronic gaming device; at least one data capture unit to collect player movement data representative of movement of at least one eye of a player of the game, the data capture device comprising a camera; and at least one processor. The processor may be configured to analyze the player movement data; generate avatar movement data based on the player movement data, the avatar movement data comprising instructions for causing at least one portion of at least one avatar to move; and transmit, via the communication unit, the avatar movement data over the network to the at least one other networked electronic gaming device, the avatar movement data causing movement of the at least one portion of the at least one avatar on a display unit of the at least one other networked electronic gaming device.

In some embodiments, the graphical game components comprise the at least one avatar, and the processor is further configured to cause movement of the at least one portion of the at least one avatar on the display unit based on the avatar movement data.

In some embodiments, the player movement data is indicative of a gaze of the player, and the avatar movement data comprises instructions for causing at least one portion of the at least one avatar to follow the gaze of the player.

In some embodiments, the at least one portion of the at least one avatar comprises at least one eye of the at least one avatar.

In some embodiments, the player movement data is further representative of movement of a head of the player, and the at least one portion of the at least one avatar comprises at least a head of the at least one avatar.

In some embodiments, the at least one processor is further configured for analyzing at least one facial expression of the player to determine, for each of the at least one facial expression, a respective emotional state of the player.

In some embodiments, the at least one processor is further configured for generating the avatar movement data based on the at least one facial expression of the player.

In some embodiments, the avatar movement data comprises instructions for causing the at least one avatar to mimic the at least one facial expression of the player.

In some embodiments, the avatar movement data comprises instructions for causing the at least one avatar to adopt a facial expression complementary to the at least one emotional state of the player.

In accordance with a further broad aspect, there may be provided a networked electronic gaming machine. The networked electronic gaming machine comprises at least one data storage unit to store game data for a game played by a player and comprising wagering and payout elements; a display unit to display, via a graphical user interface, graphical game components, including at least one avatar, in accordance with the game data; a communication unit for communicating, over a network, with at least one other networked electronic gaming machine; at least one processor. The at least one processor is configured to receive, via the communication unit, avatar movement data from at least one further networked electronic gaming machine, the avatar movement data being based at least in part on player movement data representative of movement of at least one eye of a player of the at least one further networked electronic gaming machine and comprising instructions for causing at least one portion of the at least one avatar to move; and cause movement of the at least one portion of the at least one avatar on the display unit based on the avatar movement data.

In some embodiments, the avatar movement data is further based at least in part on at least one of a facial expression and one emotional state of the player of the at least one further networked electronic gaming machine.

In accordance with a further broad aspect, there is provided a method for execution by an electronic gaming machine. The method comprises storing, in at least one data storage unit, game data for a game played by a player and comprising wagering and payout elements; displaying, via a graphical user interface, graphical game components including at least one avatar in accordance with the game data; capturing, via at least one data capture unit, player movement data representative of movement of at least one eye of the player, the data capture device comprising a camera; and using at least one processor for: analyzing the player movement data; generating avatar movement data based at least in part on the player movement data, the avatar movement data comprising instructions for causing at least one portion of the at least one avatar to move; and causing movement of the at least one portion of the at least one avatar on the display unit based on the avatar movement data.

In some embodiments, the player movement data is indicative of a gaze of the player, and the avatar movement data comprises instructions for causing at least one portion of the at least one avatar to follow the gaze of the player.

In some embodiments, the at least one portion of the at least one avatar comprises at least one eye of the at least one avatar.

In some embodiments, the player movement data is further representative of movement of a head of the player, and the at least one portion of the at least one avatar comprises at least a head of the at least one avatar.

In some embodiments, the at least one processor is further used for analyzing at least one facial expression of the player to determine, for each of the at least one facial expression, a respective emotional state of the player.

In some embodiments, the at least one processor is further used to generate the avatar movement data based on the at least one facial expression of the player.

In some embodiments, the avatar movement data comprises instructions for causing the at least one avatar to mimic the at least one facial expression of the player.

In some embodiments, the avatar movement data comprises instructions for causing the at least one avatar to adopt a facial expression complementary to the at least one emotional state of the player.

In some embodiments, the processor is further used to predictively generate avatar movement data based on previously acquired player movement data.

In accordance with a further broad aspect, there is provided a method for execution by a networked electronic gaming machine. The method comprises storing, in at least one data storage unit, game date for a game played by a player and comprising wagering and payout elements; displaying, via a graphical user interface, graphical game components including at least one avatar in accordance with the game data; capturing, via at least one data capture unit, player movement data representative of movement of at least one eye of the player, the data capture device comprising a camera; and using at least one processor for: analyzing the player movement data; and transmitting, via a communication unit, the avatar movement data over a network to the at least one other networked electronic gaming machine, the avatar movement data causing movement of the at least one portion of the at least one avatar on a display unit of the at least one other networked electronic gaming machine.

In some embodiments, the graphical game components comprise the at least one avatar, and the processor is further used to cause movement of the at least one portion of the at least one avatar on the display unit based on the avatar movement data.

In some embodiments, the player movement data is indicative of a gaze of the player, and the avatar movement data comprises instructions for causing at least one portion of the at least one avatar to follow the gaze of the player.

In some embodiments, the at least one portion of the at least one avatar comprises at least one eye of the at least one avatar.

In some embodiments, the player movement data is further representative of movement of a head of the player, and the at least one portion of the at least one avatar comprises at least a head of the at least one avatar.

In some embodiments, the at least one processor is further used for analyzing at least one facial expression of the player to determine, for each of the at least one facial expression, a respective emotional state of the player.

In some embodiments, the at least one processor is further used for generating the avatar movement data based on the at least one facial expression of the player.

In some embodiments, the avatar movement data comprises instructions for causing the at least one avatar to mimic the at least one facial expression of the player.

In some embodiments, the avatar movement data comprises instructions for causing the at least one avatar to adopt a facial expression complementary to the at least one emotional state of the player.

In accordance with a further broad aspect, there is provided a method for execution by a networked electronic gaming machine. The method comprises storing, in at least one data storage unit, game data for a game played by a player and comprising wagering and payout elements; displaying, via a graphical user interface, graphical game components including at least one avatar in accordance with the game data; and using at least one processor for: receiving, via a communication unit, avatar movement data over a network from at least one further networked electronic gaming machine, the avatar movement data being based at least in part on player movement data representative of movement of at least one eye of a player of the at least one further networked electronic gaming machine and comprising instructions for causing at least one portion of the at least one avatar to move; and causing movement of the at least one portion of the at least one avatar on the display unit based on the avatar movement data.

In some embodiments, the avatar movement data is further based at least in part on at least one of a facial expression and one emotional state of the player of the at least one further networked electronic gaming machine.

In accordance with certain embodiments, there is provided a computer readable medium having stored thereon program code executable by at least one processor for performing any one or more of the methods described herein.

Features of the systems, devices, and methods described herein may be used in various combinations, and may also be used for the system and computer-readable storage medium in various combinations.

In this specification, the term "game component" or game element is intended to mean any individual element which when grouped with other elements will form a layout for a game. For example, in card games such as poker, blackjack, and gin rummy, the game components may be the cards that form the player's hand and/or the dealer's hand, and cards that are drawn to further advance the game. As a further example, in navigational games the game components may be moving or stationary objects to avoid or hit to achieve different game goals. In a maze game, the game components may be walls of the maze, objects within the maze, features of the maze, and so on. In a traditional Bingo game, the game components may be the numbers printed on a 5×5 matrix which the players must match against drawn numbers. The drawn numbers may also be game components. In a spinning reel game, each reel may be made up of one or more game components. Each game component may be represented by a symbol of a given image, number, shape, color, theme, etc. Like symbols are of a same image, number, shape, color, theme, etc. Other embodiments for game components will be readily understood by those skilled in the art.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Figure 1:
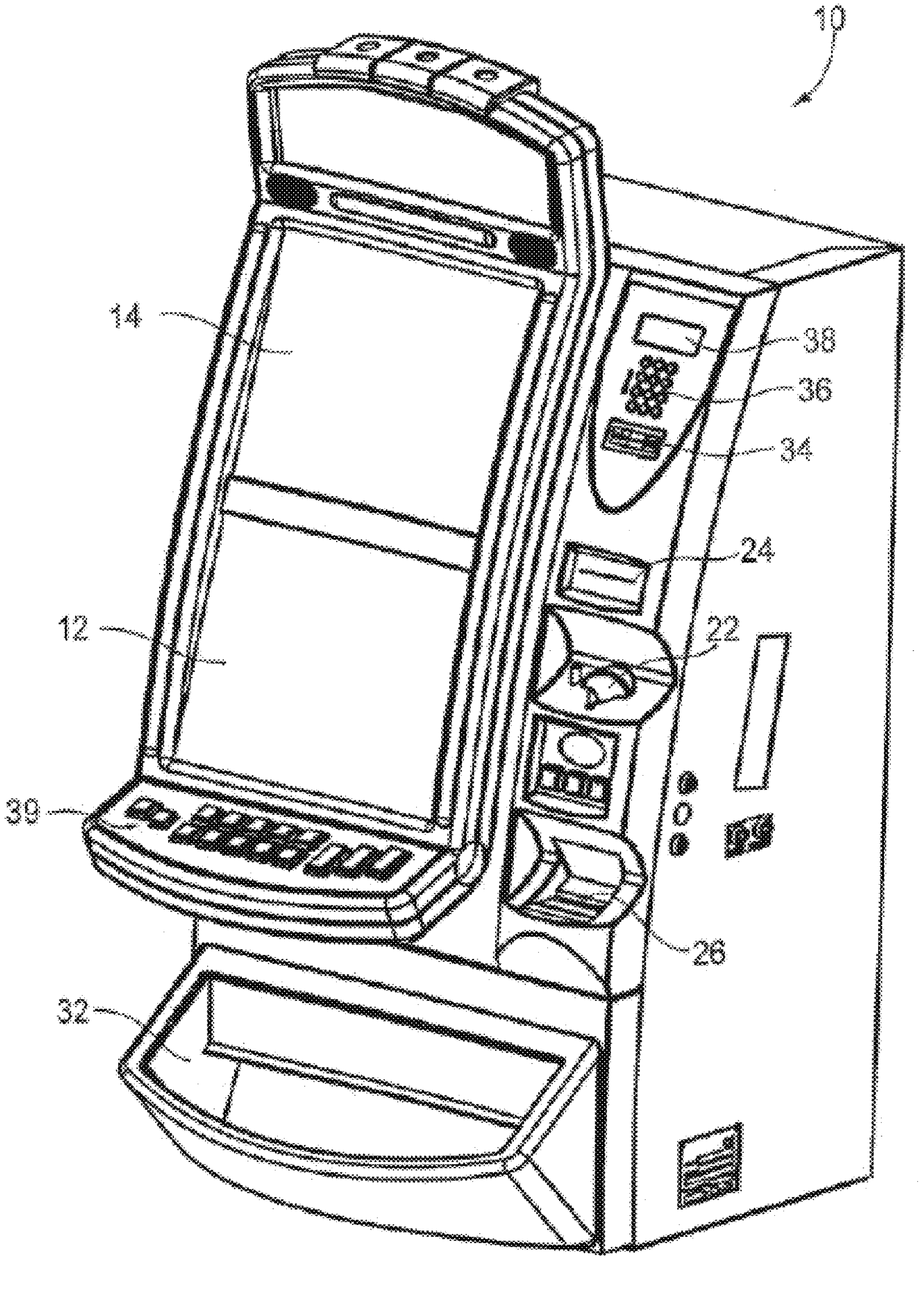
FIG. 1 is a perspective view of an electronic gaming machine for implementing the gaming enhancements, in accordance with one embodiment.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, gaming machine, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or a combination thereof, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may transform electronic signals of various data objects into graphical representations for display on a tangible screen configured for displaying graphical game components. One should appreciate that the systems and methods described herein involve interconnected networks of hardware devices configured to receive data for tracking player movements using receivers and sensors, transmit player movement data using transmitters, and transform electronic data signals for various graphical enhancements using particularly configured processors to modify the display of the graphical enhancements on adapted display screens in response to the tracked player movements. That is, tracked player movements may result in manipulation and movement of various graphical features of a game.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The gaming enhancements described herein may be carried out using any type of computer, including portable devices, such as smart phones, that can access a gaming site or a portal (which may access a plurality of gaming sites) via the internet or other communication path (e.g., a LAN or WAN). Embodiments described herein can also be carried out using an electronic gaming machine (EGM) in various venues, such as a casino. One example type of EGM is described with respect to FIG. 1.

FIG. 1 is a perspective view of an EGM 10 where the graphical enhancements to game components may be provided. EGM 10 includes a display unit 12 that may be a thin film transistor (TFT) display, a liquid crystal display (LCD), a cathode ray tube (CRT), auto stereoscopic three-dimensional display and LED display, an OLEO display, or any other type of display. A secondary display unit 14 provides game data or other information in addition to display unit 12. Secondary display unit 14 may provide static information, such as an advertisement for the game, the rules of the game, pay tables, pay lines, or other information, or may even display the main game or a bonus game along with display unit 12. Alternatively, the area for secondary display unit 14 may be a display glass for conveying information about the game. Display unit 12 and/or secondary display unit 14 may also include a camera.

Display unit 12 or 14 may have a touch screen lamination that includes a transparent grid of conductors. Touching the screen may change the capacitance between the conductors, and thereby the X-Y location of the touch may be determined. The processor associates this X-Y location with a function to be performed. Such touch screens may be used for slot machines. There may be an upper and lower multi-touch screen in accordance with some embodiments.

A coin slot 22 may accept coins or tokens in one or more denominations to generate credits within EGM 10 for playing games. An input slot 24 for an optical reader and printer receives machine readable printed tickets and outputs printed tickets for use in cashless gaming.

A coin tray 32 may receive coins or tokens from a hopper upon a win or upon the player cashing out. However, the gaming machine 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

A card reader slot 34 may accept various types of cards, such as smart cards, magnetic strip cards, or other types of cards conveying machine readable information. The card reader reads the inserted card for player and credit information for cashless gaming. The card reader may read a magnetic code on a conventional player tracking card, where the code uniquely identifies the player to the host system. The code is cross-referenced by the host system to any data related to the player, and such data may affect the games offered to the player by the gaming terminal. The card reader may also include an optical reader and printer for reading and printing coded barcodes and other information on a paper ticket. A card may also include credentials that enable the host system to access one or more accounts associated with a player. The account may be debited based on wagers by a player and credited based on a win. Alternatively, an electronic device may couple (wired or wireless) to the EGM 10 to transfer electronic data signals for player credits and the like. For example, near field communication (NFC) may be used to couple to EGM 10 which may be configured with NFC enabled hardware. This is a non-limiting example of a communication technique.

A keypad 36 may accept player input, such as a personal identification number (PI N) or any other player information. A display 38 above keypad 36 displays a menu for instructions and other information and provides visual feedback of the keys pressed.

The keypad 36 may be an input device such as a touchscreen, or dynamic digital button panel, in accordance with some embodiments.

Player control buttons 39 may include any buttons or other controllers needed for the play of the particular game or games offered by EGM 10 including, for example, a bet button, a repeat bet button, a spin reels (or play) button, a maximum bet button, a cash-out button, a display pay lines button, a display payout tables button, select icon buttons, and any other suitable button. Buttons 39 may be replaced by a touch screen with virtual buttons.

The EGM 10 may also include hardware configured to provide motion tracking. An example type of motion tracking is optical motion tracking. The motion tracking may include a body and head controller. The motion tracking may also include an eye controller. The EGM 10 may implement eye-tracking recognition technology using a camera, sensors (e.g. optical sensor), data receivers and other electronic hardware. Players may move side to side to control the game and game components. For example, the EGM 10 is configured to track player's eyes, so when the eyes move left, right, up or down, a character or symbol on screen moves in response to the player's eye movements. In a navigational game, the player may have to avoid obstacles, or possibly catch items to collect. The virtual movements may be based on the tracking recognition data.

The EGM 10 may include a camera. The camera may be used for motion tracking of player, such as detecting player positions and movements, and generating signals defining x, y and z coordinates. For example, the camera may be used to implement tracking recognition techniques to collect tracking recognition data. As an example, the tracking data may relate to player eye movements. The eye movements may be used to control various aspects of a game or a game component. The camera may be configured to track the precise location of a player's left and/or right eyeballs in real-time or near real-time as to interpret and record the player's eye movement data. The eye movement data may be one way of defining player movements.

For example, the recognition data defining player movement may be used to manipulate or move game components. As another example, the recognition data defining player movement may be used to change a view of the gaming surface or gaming component. A viewing object of the game may be illustrated as a graphical enhancement coming towards the player. Another viewing object of the game may be illustrated as a graphical enhancement moving away from the player. The players head position may be used as a view guide for the viewing camera during a graphical enhancement. A player sitting directly in front of display unit 12 may see a different view than a player moving aside. The camera may also be used to detect occupancy of the machine.

The embodiments described herein are implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

Accordingly, EGM 10 is particularly configured for moving game components. The display unit 12 and/or the secondary display unit 14 may display via a user interface graphical game components of a game in accordance with a set of game rules using game data, stored in a data storage device.

At least one data capture unit collects player movement data, where the player movement data defines movement of a player of the game. The data capture unit may include a camera, a sensor or other data capture electronic hardware. The EGM 10 may include at least one processor configured to analyze the player movement data, to generate movement data for moving at least one game component, and to generate movement on the display device of the at least one game component using the data defining game movement.

The embodiments described herein involve computing devices, servers, electronic gaming terminals, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, electronic gaming terminals, receivers, transmitters, processors, memory, display, networks particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

As described herein, EGM 10 may be configured to provide graphical enhancements to game components. The graphical enhancements may be provided dynamically as dynamic game content in response to electronic data signals relating to tracking recognition data collected by EGM 10.

The EGM 10 may include a display with multi-touch and auto stereoscopic three-dimensional functionality, including a camera, for example. The EGM 10 may also include several effects and frame lights. The graphical enhancements may be graphical variants of gaming components. For example, the graphical variants may not be limited to a three-dimensional version of the gaming components.

EGM 10 may include an output device such as one or more speakers. The speakers may be located in various locations on the EGM 10 such as in a lower portion or upper portion. The EGM 10 may have a chair or seat portion and the speakers may be included in the seat portion to create a surround sound effect for the player. The seat portion may allow for easy upper body and head movement during play. Functions may be controllable via an on screen game menu. The EGM 10 is configurable to provide full control over all built-in functionality (lights, frame lights, sounds, and so on).

The EGM 10 may also include a digital button panel. The digital button panel may include various elements such as a touch display, animated buttons, a frame light, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on. The EGM 10 may also include physical buttons.

The EGM 10 may include frame and effect lights. The lights may be synchronized with enhancements of the game. The EGM 10 may be configured to control color and brightness of lights. Additional custom animations (color cycle, blinking, etc.) may also be configured by the EGM 10. The customer animations may be triggered by certain gaming events.

Figure 2A:
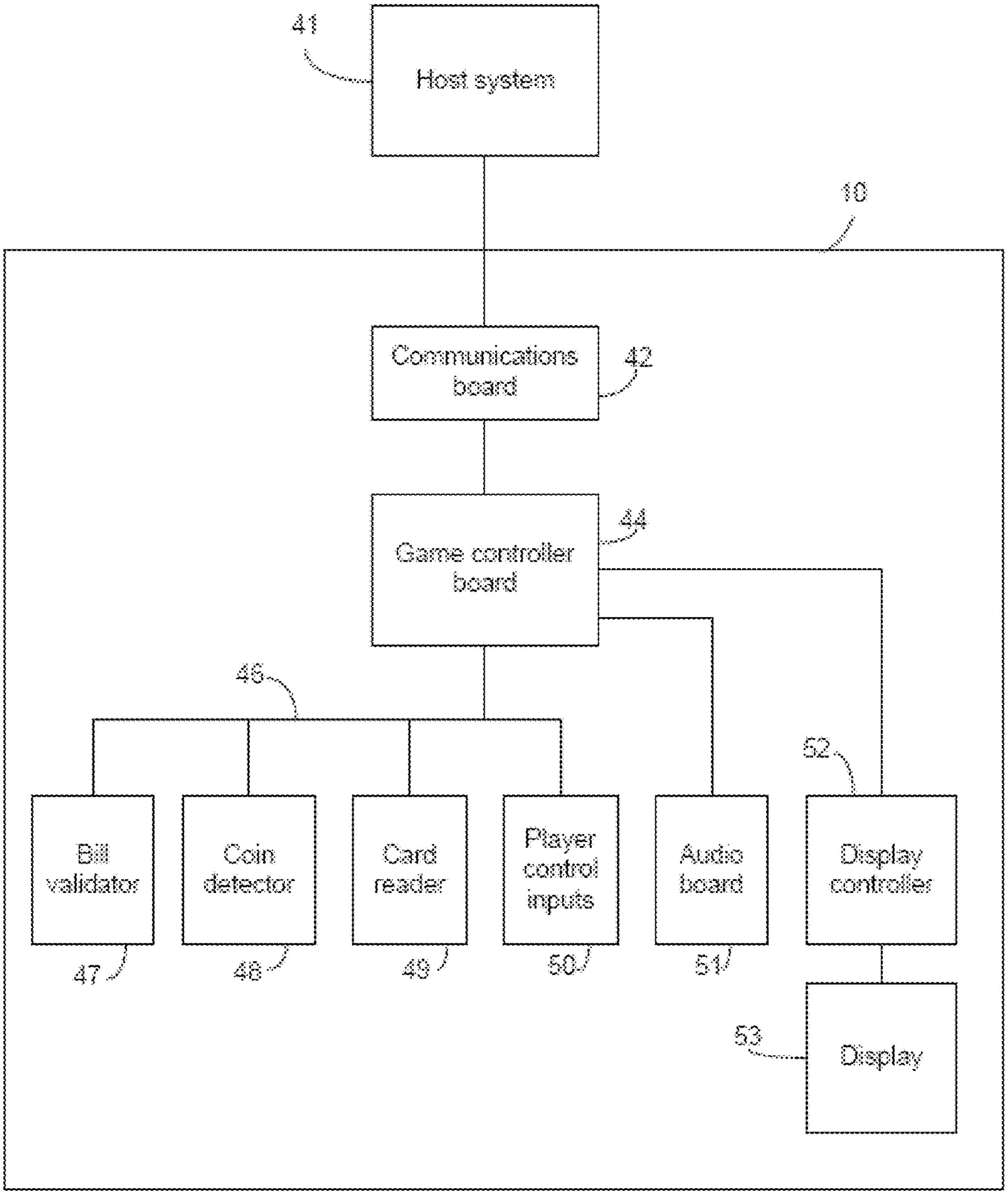
FIG. 2A is a block diagram of an electronic gaming machine linked to a casino host system, in accordance with one embodiment.
Figure 2B:
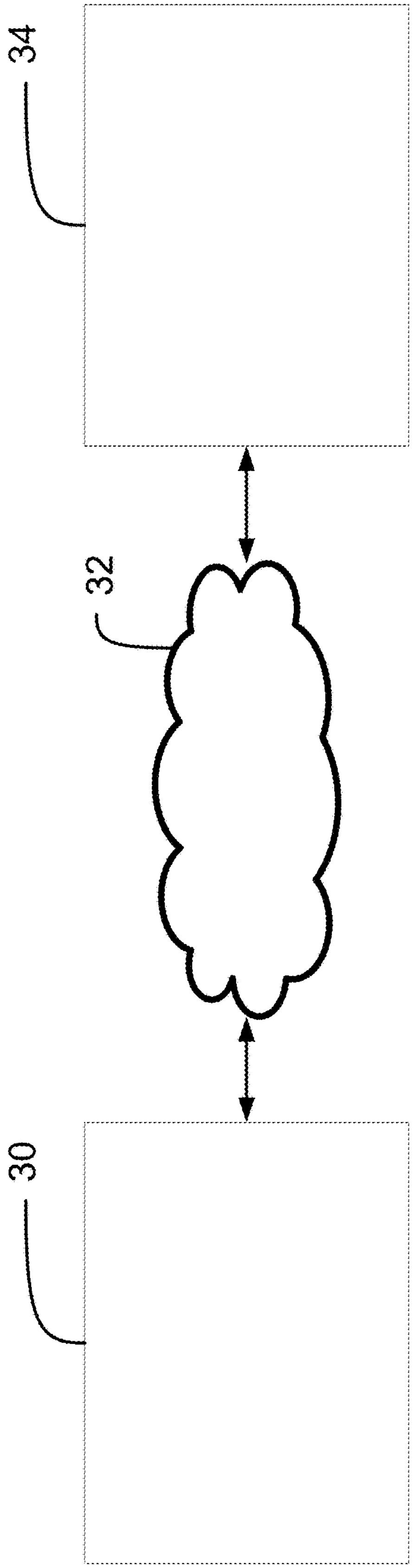
FIG. 2B is an exemplary online implementation of a computer system and online gaming system.

FIG. 2A is a block diagram of EGM 10 linked to the casino's host system 41. The EGM 10 may use conventional hardware. FIG. 2B illustrates a possible online implementation of a computer system and online gaming device in accordance with the present gaming enhancements. For example, a server computer 34 may be configured to enable online gaming in accordance with embodiments described herein. One or more players may use a computing device 30 (which may be the EGM 10) that is configured to connect to the Internet 32 (or other network), and via the Internet 32 to the server computer 34 in order to access the functionality described in this disclosure. The server computer 34 may include a movement recognition engine that may be used to process and interpret collected player movement data, to transform the data into data defining manipulations of game components or view changes.

A communications board 42 may contain conventional circuitry for coupling the EGM 10 to a local area network (LAN) or other type of network using any suitable protocol, such as the G2S protocols. Internet protocols are typically used for such communication under the G2S standard, incorporated herein by reference. The communications board 42 transmits using a wireless transmitter, or it may be directly connected to a network running throughout the casino floor. The communications board 42 basically sets up a communication link with a master controller and buffers data between the network and the game controller board 44. The communications board 42 may also communicate with a network server, such as in accordance with the G2S standard, for exchanging information to carry out embodiments described herein.

The game controller board 44 contains memory and a processor for carrying out programs stored in the memory and for providing the information requested by the network. The game controller board 44 primarily carries out the game routines.

Peripheral devices/boards communicate with the game controller board 44 via a bus 46 using, for example, an RS-232 interface. Such peripherals may include a bill validator 47, a coin detector 48, a smart card reader or other type of credit card reader 49, and player control inputs 50 (such as buttons or a touch screen). Other peripherals may be one or more cameras used for collecting eye-tracking recognition data, or other player movement recognition data.

The game controller board 44 may also control one or more devices that produce the game output including audio and video output associated with a particular game that is presented to the player. For example audio board 51 may convert coded signals into analog signals for driving speakers. A display controller 52, which typically requires a high data transfer rate, may convert coded signals to pixel signals for the display 53. Display controller 52 and audio board 51 may be directly connected to parallel ports on the game controller board 44. The electronics on the various boards may be combined onto a single board.

Computing device 30 may be particularly configured with hardware and software to interact with gaming machine 10 or gaming server 34 via network 32 to implement gaming functionality and render graphical enhancements, as described herein. For simplicity only one computing device 30 is shown but system may include one or more computing devices 30 operable by players to access remote network resources. Computing device 30 may be implemented using one or more processors and one or more data storage devices configured with database(s) or file system(s), or using multiple devices or groups of storage devices distributed over a wide geographic area and connected via a network (which may be referred to as "cloud computing").

Computing device 30 may reside on any networked computing device, such as a personal computer, workstation, server, portable computer, mobile device, personal digital assistant, laptop, tablet, smart phone, WAP phone, an interactive television, video display terminals, gaming consoles, electronic reading device, portable electronic devices, wearable electronic device, or any suitable combination of these.

Computing device 30 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Computing device 30 may include any type of computer memory that is located either internally or externally such as, for example, random-access memory (RAM), readonly memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Computing device 30 may include one or more input devices, such as a keyboard, mouse, camera, touch screen and a microphone, and may also include one or more output devices such as a display screen (with three-dimensional capabilities) and a speaker. Computing device 30 has a network interface in order to communicate with other components, to access and connect to network resources, to serve an application and other applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Computing device 30 is operable to register and authenticate players (using a login, unique identifier, and password for example) prior to providing access to applications, a local network, network resources, or other networks and network security devices. Computing device 30 may serve one player or multiple players.

While the following paragraphs refer to the EGM 10, it should be understood that the embodiments described herein may be implemented on the computing device 30, which may take a plurality of different forms including, as mentioned supra, mobile devices such as smartphones, and other portable or wearable electronic devices.

Figure 3:
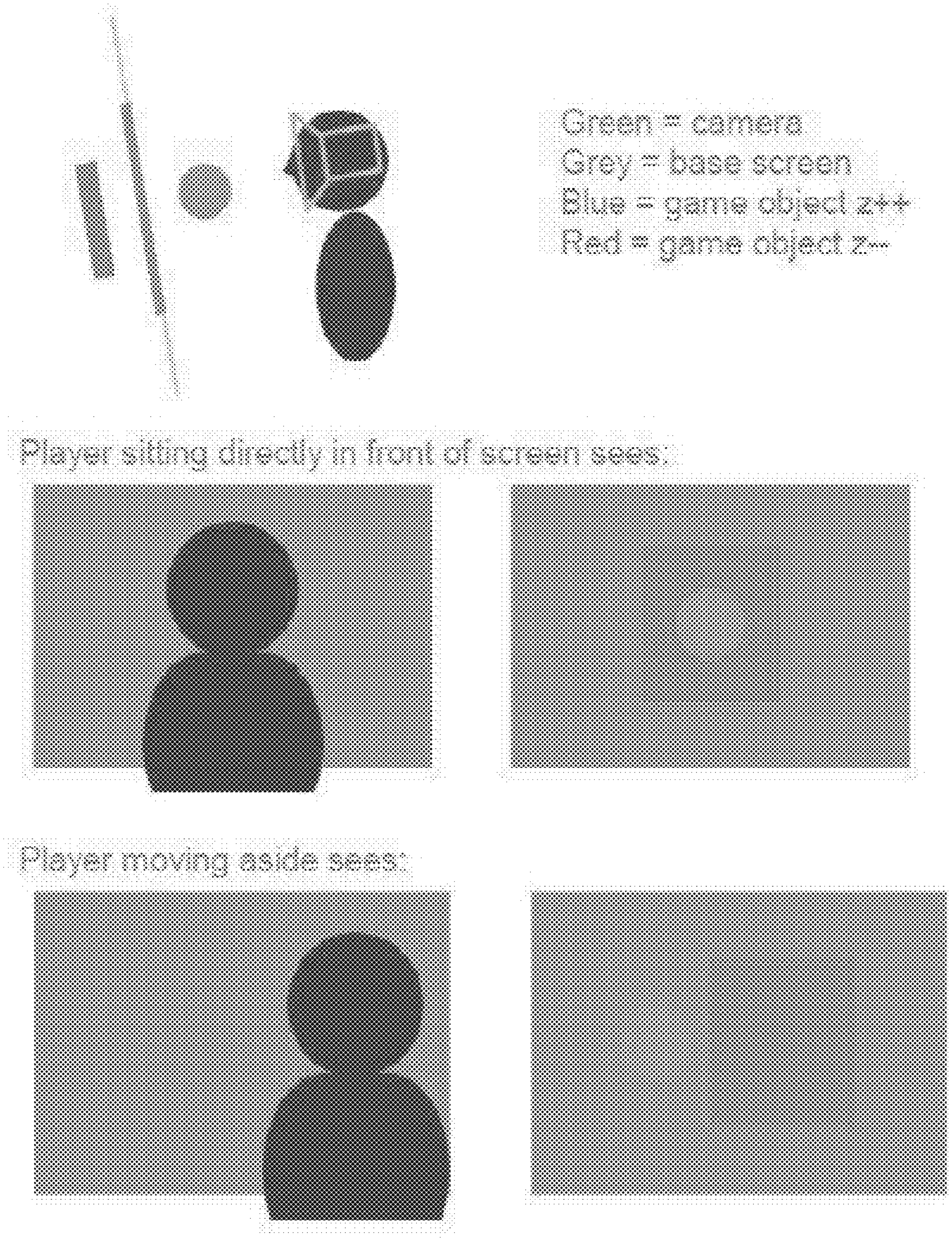
FIG. 3 illustrates an electronic gaming machine with a camera for implementing the gaming enhancements, in accordance with some embodiments.

FIG. 3 illustrates an electronic gaming machine with a camera 15 for implementing the gaming enhancements, in accordance with some embodiments. The EGM 10 may include the camera 15, sensors (e.g. optical sensor), or other hardware device configured to capture and collect data relating to player movement.

In accordance with some embodiments, the camera 15 may be used for motion tracking, and movement recognition. The camera 15 may collect data defining x, y and z coordinates representing player movement.

In some examples, a viewing object of the game (shown as a circle in front of the base screen) may be illustrated as a graphical enhancement coming towards the player. Another viewing object of the game (shown as a rectangle behind the base screen) may be illustrated as a graphical enhancement moving away from the player. The players head position may be used as a view guide for the viewing camera during a graphical enhancement. A player sitting directly in front of display unit 12 may see a different view than a player moving aside. The camera 15 may also be used to detect occupancy of the machine. The camera 15 and/or a sensor (e.g. an optical sensor) may also be configured to detect and track the position(s) of a player's eyes or more precisely, pupils, relative to the screen of the EGM 10.

The camera 15 may also be used to collect data defining player eye movement, gestures, head movement, or other body movement. Players may move side to side to control the game. The camera 15 may collect data defining player movement, process and transform the data into data defining game manipulations (e.g. movement for game components), and generate the game manipulations using the data. For example, player's eyes may be tracked by camera 15 (or another hardware component of EGM 10), so when the eyes move left, right, up or down, their character or symbol on screen moves in response to the player's eye movements. The player may have to avoid obstacles, or possibly catch or contact items to collect depending on the type of game. These movements within the game may be directed based on the data derived from collected movement data.

In one embodiment of the invention, the camera 15 is coupled with an optical sensor to track a position of a player's each eye relative to a center of a EGM 10's screen, as well as a focus direction and a focus point on the EGM 10's screen of the player's both eyes in real-time or near real-time. The focus direction can be the direction at which the player's line of sight travels or extends from his or her eyes to the EGM 10's screen. The focus point may sometimes be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be examples of, and referred to as, player's eye movements or player movement data.

Figure 4:
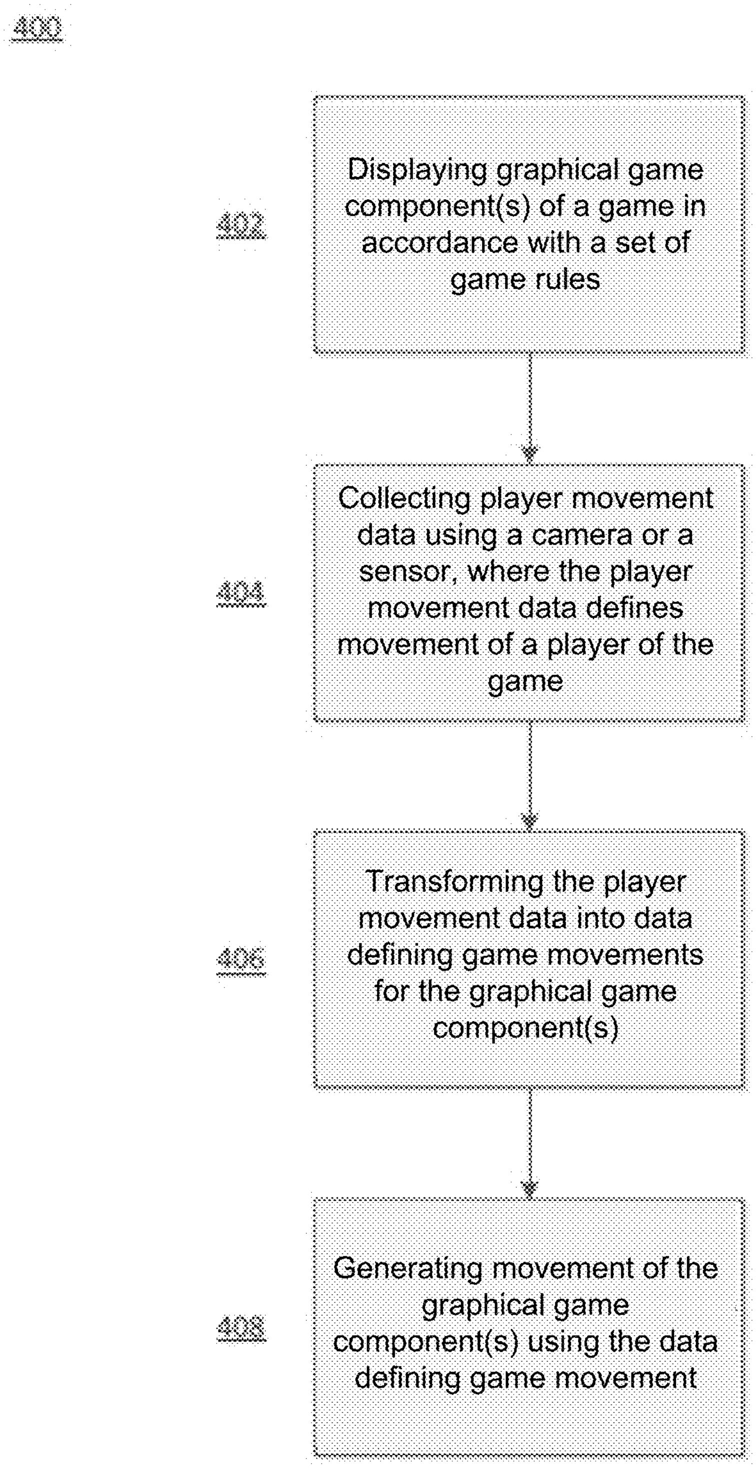
FIG. 4 illustrates a flowchart diagram of an exemplary computer-implemented method for the game component enhancements.

Referring now to FIG. 4, there is shown a flowchart diagram of an exemplary computer-implemented method 400 for moving game component in a gaming system such as that illustrated in FIGS. 1, 2A, and 2B.

At 402, the EGM 10 displays on a display device, such as display unit 12 and/or secondary display unit 14, a user interface showing one or more graphical game components of a game in accordance with a set of game rules for the game. The game component may be a virtual character, a gaming symbol, a stack of game components along an axis orthogonal to a plane of the display device, a multi-faceted game component, a reel, a grid, a multi-faceted gaming surface, and gaming surface, or a combination thereof.

A game component may be selected to move or manipulate with the player's eye movements. The gaming component may be selected by the player or by the game. For example, the game outcome or state may determine which symbol to select for enhancement.

At 404, a data capture unit collects player movement data, where the player movement data defines movement of the player. The data capture unit may be a camera, a sensor, and/or other hardware device configured to capture and collect data relating to player movement. The data capture unit may integrally connect to EGM 10 or may be otherwise coupled thereto.

As previously described, the camera 15 may be coupled with an optical sensor to track a position of a player's each eye relative to a center of a EGM 10's screen, as well as a focus direction and a focus point on the EGM 10's screen of the player's both eyes in real-time or near real-time. The focus direction can be the direction at which the player's line of sight travels or extends from his or her eyes to the EGM 10's screen. The focus point may sometimes be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises. All of the above mentioned eye tracking or movement data, as well as the focus direction and focus point, may be instances of player movement data.

In addition, a focus point may extend to or encompass different visual fields visible to the player. For example, a foveal area may be a small area surrounding a fixation point on the EGM 10's screen directly connected by a (virtual) line of sight extending from the eyes of a player. This foveal area in the player's vision generally appears to be in sharp focus and may include one or more game components and the surrounding area. In this disclosure, it is understood that a focus point may include the foveal area immediately adjacent to the fixation point directly connected by the (virtual) line of sight extending from the player's eyes.

The player movement data may relate to the movement of the player's eyes. For example, the player's eyes may move or look to the left which may trigger a corresponding movement of a game component within the game. The movement of the player's eyes may also trigger an updated view of the entire game on display to reflect the orientation of the player in relation to the display device. The player movement data may also be associated with movement of the player's head, or other part of the player's body. As a further example, the player movement data may be associated with a gesture made by the player, such as a particular hand or finger signal.

At 406, a processor of EGM 10 (e.g. coupled thereto or part thereof) may transform the player movement data into data defining game movement for the game component(s).

At 408, the processor generates movement of the game component(s) using the data defining game movement. The display device updates to visually display the movement of the game component(s) for the player. The movement may be a rotation about an axis, or directional movement (e.g. left, right, up, down), or a combination thereof. The movement may also be an update a view of the game on the display using the data defining game movement.

Accordingly, the EGM 10 is configured to monitor and track player movement including eye movement data, and in response generate corresponding movements of the game component(s). The EGM 10 (e.g. processor) may be programmed with control logic to map different player movements to different movements of the game component(s).

Figure 5:
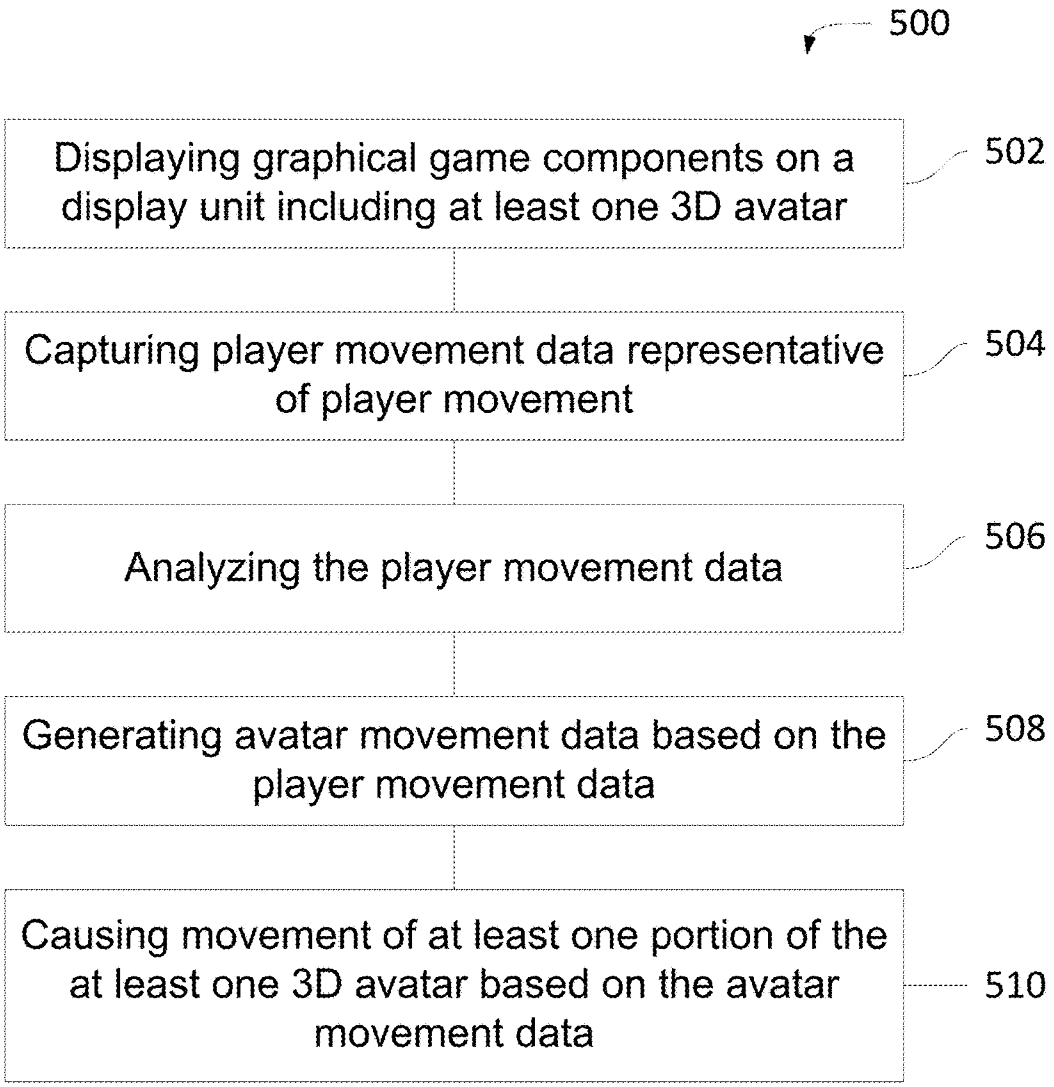
FIG. 5 illustrates a flowchart diagram of an exemplary computer-implemented method for causing movement in a 3D avatar.

With reference to FIG. 5, there is provided an exemplary computer-implemented method 500 for presenting at least one three-dimensional virtual avatar ("3D avatar") on the display unit 12 (or the display unit 14) and for causing movement of the 3D avatar. The method 500 is illustrated as a flowchart, and may be implemented, for example, by the EGM 10.

In step 502, the EGM 10 may display, on the display unit 12, graphical game components including at least one 3D avatar. 3D avatars as considered within the scope of the present disclosure may take on any suitable form, for example a humanoid figure, such as a man, a woman, a child, an infant, and may be of any suitable height, size, age, etc. 3D avatars may also resemble an animal, an insect, a microbe, or any other living creature, which may include fictional creatures, such as unicorns, dragons, pores, and the like. 3D avatars may also take on the shape of any suitable animate or inanimate object, such as paperclips, architecture, books, computing devices, toys, and the like. 3D avatars may be static, insofar as they may not be animated or display any motion, or may be dynamic, displaying motion in response to at least one trigger, which may internal or external to the EGM 10. Additionally, while the present disclosure is primarily concerned with 3D avatars, it should be noted that the present disclosure does not exclude the use of two-dimensional avatars ("2D avatars"), including embodiments where, instead of, or in addition to, 3D avatars, 2D avatars are displayed on the display unit 12.

In step 504, the EGM 10 captures player movement data. The player movement data may be representative of one or more parameters of movement of the player, including movement of at least one eye of the player, movement of a head of the player, movement of a torso of the player, and may additionally or alternatively be representative of a gaze of the player. Player movement data may be collected via the camera, or via any other suitable sensor mentioned hereinabove. Player movement data may be representative of position, orientation, and/or movement of at least one eye of the player, and may provide information about where a player is looking in relation to the EGM 10. This may provide specific information regarding which of the display units 12, 14 the player is looking at and where on the display units 12, 14 the player is looking; additionally, or in the alternative, the player movement data may indicate a path covered by the gaze of the player across the display units 12, 14, the speed at which the path was traversed, and the like. Additionally, the player movement data may also be representative of movement of a head of the player, of the head and at least one shoulder of the player, or of an entire upper body of the player. The player movement data may be captured in a substantially real-time stream, at periodic intervals, or based on one or more triggers internal or external to the EGM 10. In some cases, the tracking of player movement data may be a premium feature available to only certain players: premium features may be allocated to players who play games at a certain frequency, or who spend a certain amount of money playing (on the whole or per unit time). Access to premium features may be tied to the player account.

At step 506, the player movement data captured at step 504 may be analyzed by the EGM 10, and more specifically by the game controller board 44. The analysis may be performed in any suitable fashion, including motion detection, edge detection, full-scale detection, and the like. The player movement data may be analyzed to detect, for example, motion of the player's eyes, head, shoulders, and/or upper body, as described hereinabove, in three-dimensional space. In some embodiments, the player movement data may be analyzed to determine the location and orientation of the player's eye or eyes, which may include determining a location at which the player is looking, specifically a location on the display unit 12 or the secondary display unit 14 at which the player is looking, as discussed supra. Alternatively, or in addition, the player movement data may be analyzed to determine the direction and/or speed of motion of the player's eye or eyes.

In cases where the analysis of the player movement data indicates that the player is not looking at either display unit 12, or generally not paying attention to the EGM 10, the EGM 10 may be interested in the last location on the display unit 12 or the secondary display unit 14 at which the player was looking. As such, the analysis of the player movement data may be stored, temporarily or permanently, in the memory of the game controller board 44.

At step 508, the EGM 10 may generate avatar movement data based on the player movement data. More specifically, the EGM 10 may use the analysis performed in step 506 to generate the avatar movement data. The avatar movement data may comprise at least one instruction, though typically the avatar movement data may comprise a plurality of instructions, for causing at least one portion of the at least one 3D avatar to move. The avatar movement data may comprise at least one instruction in any suitable format, and the at least one instruction may cause the at least one portion of the at least one 3D avatar to move in any suitable fashion. In embodiments where at least one 3D avatar is a humanoid, this may include such motions as tilting of a head of the humanoid 3D avatar, waving of a hand of the humanoid 3D avatar, a displacement of the humanoid 3D avatar from a first location on the display unit 12 to a second, different location on the display unit, and the like. Similarly suitable movements are considered when at least one 3D avatar is an animal or other living creature, or any other animate or inanimate object. Further example movements are discussed hereinafter.

At step 510, the EGM 10 causes movement of the at least one portion of the at least one 3D avatar based on the avatar movement data generated at step 508. More specifically, the EGM 10 causes changes in the graphical game components displayed on the display unit 12 which appear to the player as movement of the at least one portion of the at least one 3D avatar. In some embodiments, causing movement of the at least one portion of the at least one 3D avatar may comprise adding and/or removing graphical game components.

It should be noted that the above-presented steps may be repeated as many times as desired in response to further player movement data being collected (and further avatar movement data being generate). The following paragraphs describe an exemplary embodiment thereof with reference to FIGS. 6A-C.

Figure 6A:
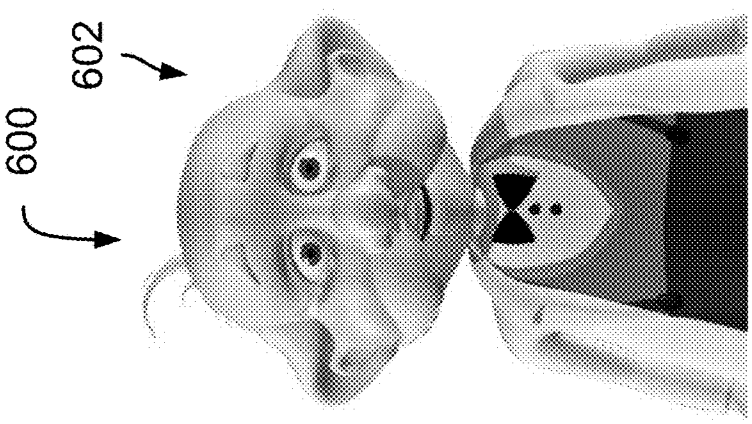
FIGS. 6A-C are illustrative screenshots of game screens of a particular implementation of the method described in FIG. 5.
Figure 6B:
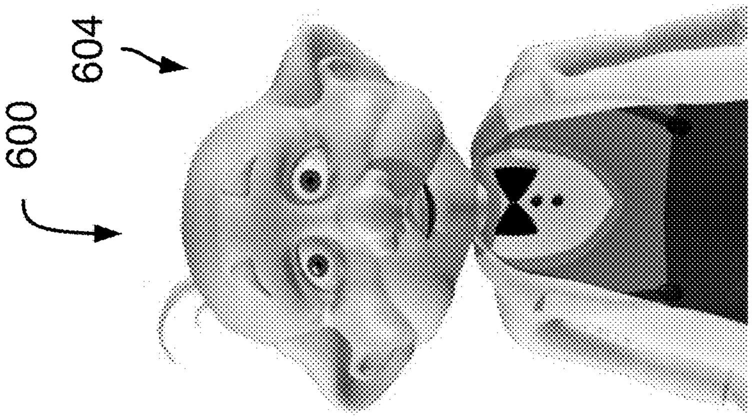
Figure 6C:
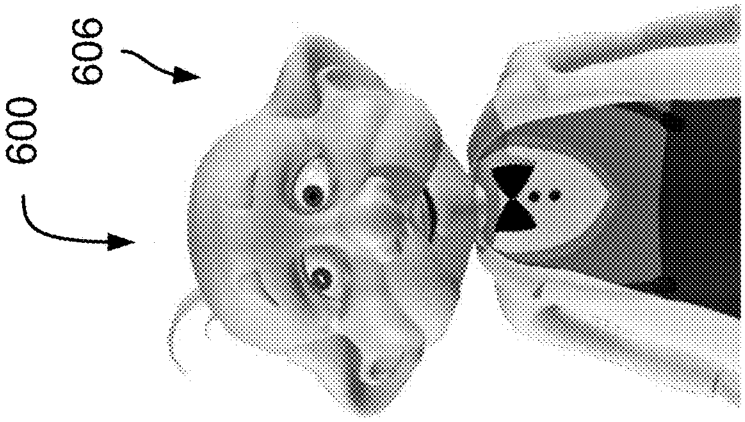

FIGS. 6A-C illustrate exemplary embodiments of a 3D avatar 600 which may be displayed on the display unit 12. The 3D avatar 600 takes on the form of an elderly male having a head, a torso, and two arms, and may move in a variety of ways, may take on a variety of poses, and may present one or more facial expressions. In this non-limiting exemplary embodiment, the 3D avatar 600 may be configured to move to track the gaze of the player playing the game.

In FIG. 6A, the 3D avatar 600 takes on a first pose 602, which may be a "neutral pose". That is to say, the pose 602 may be the pose the 3D avatar 600 first takes on when first displayed on the display unit 12. Additionally, the pose 602 may be the pose the 3D avatar 600 adopts when the player is looking directly at the 3D avatar 600, as the 3D avatar 600 may be configured for tracking the gaze of the player. The pose 602 may also be adopted by the 3D avatar 600 in other suitable situations.

In some embodiments, the 3D avatar 600 may exhibit idle animations. These may include animations for breathing, blinking, and the like, or other more complex animations, such as stretching, thumb twiddling, head scratching, and the like. These idle animations may be exhibited when no avatar movement data has been generated, which may come in response to an extended period of lack of interaction by the player with the EGM 10, or based on any other suitable factors.

In FIG. 6B, in response to the player shifting his or her gaze to the left, the 3D avatar 600 may exhibit motion which causes the 3D avatar to shift from pose 602 to pose 604. By moving to pose 604, the head of the 3D avatar 600 has tilted to the left (from the perspective of the player), and the eyes of the 3D avatar move to point in the direction of the point on the display unit 12 at which the player is looking. Additionally, it should be noted that different embodiments of the 3D avatar may exhibit different types of movement depending on the nature of the 3D avatar, and depending on the avatar movement data generated by the EGM 10.

In FIG. 6C, in response to the player shifting his or her gaze further to the left, such as to a top-left corner of the display unit 12, the 3D avatar 600 may exhibit motion which causes the 3D avatar to shift from pose 604 to pose 606. By moving to pose 606, the head of the 3D avatar 600 has tilted slightly more to the left (from the perspective of the player), and the eyes of the 3D avatar again move to point in the direction of the point on the display unit 12 at which the player is looking. Moreover, the shoulders of the 3D avatar have somewhat inclined.

It should also be noted that the EGM 10 may, in response to avatar movement data, also effect changes to graphical game components which are not proper to the 3D avatar itself. For example, and as is seen in FIGS. 6A-C, the shadow cast by the head of the 3D avatar 600 also shifts as the 3D avatar 600 moves from pose 602 to 606: effecting this change in graphical game components may require the EGM 10 to perform shadowing calculations based on the position, direction, and intensity of a light-source graphical game component and the particular pose 602, 604, 606 of the 3D avatar 600. Other animations and changes in graphical came components may also accompany motion in the at least one portion of the at least one 3D avatar based on avatar movement data.

As discussed supra, the camera which captures the player movement data may be configured for capturing data not only representative of at least one eye of the player, but also the head of the player, the shoulders of the player, and the torso of the player, to name a few non-limiting examples. Generally speaking, the player movement data may be representative of any motion or movement of the player which may be processed by the EGM 10 to generate avatar movement data.

For example, in embodiments where the camera may track upper-body movement of the player, a humanoid 3D avatar may be configured for substantially mimicking the upper-body movement of the player. Thus, the humanoid 3D avatar may tilt its head in response to the player tilting his or her head, or may roll its eyes in response to the player rolling his or her eyes. Similarly, in embodiments where the camera may track arm and/or hand movement of the player, the humanoid 3D avatar may move its arms and/or hands to follow arm and/or hand movements of the player. This may allow the humanoid 3D avatar to, for example, play a game of "peekaboo" with the player. In another embodiment, the EGM 10 may process hand movements of a player and have a 3D avatar move in a complimentary or responsive fashion: for example, a particular game may require a player to point their fingers at certain sections of the screen. When successfully completed, the EGM 10 may cause the 3D avatar to clap its hands, or to give a "thumbs up!" sign, or any other suitable response. In a further embodiment, the EGM 10 may be configured to process the hand gestures of the player to determine what sign language signs the player is performing, which may cause the humanoid 3D avatar to respond with its own sign language signs.

As another example, the EGM 10 may be configured to analyze the player movement data by analyzing at least one facial expression of the player. The EGM 10 may accomplish this through any suitable means, and may detect any number of facial expressions, including smiles, frowns, raised eyebrows, furrowed brows, and the like. The EGM 10 may then determine, based on the at least one facial expression, a respective emotional state of the player. For example, if the analysis of the EGM 10 reveals that the player is smiling, the EGM 10 may determine that the player is happy; similarly, if the analysis of the EGM 10 reveals that a mouth of the player is agape, the EGM 10 may determine that the player is surprised.

The EGM 10 may then generate avatar movement data based at least in part on the facial expressions of the player and/or the determined emotional state of the player. For example, if the EGM 10 determines that the player is smiling, or surprised, the avatar movement data may cause the 3D avatar to mimic the player by smiling, or acting surprised, respectively. Alternatively, or in addition, the avatar movement data generated by the EGM 10 may cause the 3D avatar to adopt facial expressions complimentary to those expressed by the player. For example, if the EGM 10 detects that the player may be sad because the analysis of the player movement data reveals that the player is frowning, the EGM 10 may generate avatar movement data which may cause animations in the 3D avatar which attempt to cheer the player up. In another example, if the EGM 10 detects that the player may be surprised because the analysis of the player movement data reveals that the mouth of the player is agape, for example because the player has just won a large payout, the EGM 10 may generate avatar movement data which may cause the 3D avatar to cheer the player on or to clap.

Still further implementations are considered whereby the EGM 10 acquires player movement data, analyzes it, and generates avatar movement data based on the player movement data. For example, where the player must make a selection at a menu, the EGM 10 may track one of the gaze of the player and a pointing finger of the player, and may cause a 3D avatar to point at the same point where the player is looking or pointing. Furthermore, the EGM 10 may be configured for using predictive algorithms and/or methods for predictively effecting movement in the 3D avatar. This may be based, for example, on player movement data previously acquired by the EGM 10, or based on collections of bulk player movement data from multiple players.

In some embodiments, the EGM 10 may be networked—that is to say, the EGM 10 may be configured to communicate over a network with at least one other networked EGM 10, as described supra (in relation to FIG. 2B), and may communicate over a network comprising a central server. To this end, the EGM 10 may comprise the communications board 42, or more generally a communications unit for controlling communications with other EGM 10 and/or with the central server. The communication unit may allow for the EGM 10 to communicate with other EGM 10 with like network capabilities, and that the central server may be used to facilitate communications between EGM 10.

In some embodiments, the communication unit of the EGM 10 may be used to transmit avatar movement data over the network to at least one other EGM, particularly in the context of networked gaming, also known as "online gaming". Online gaming is a type of gaming where the player at EGM 10 plays in competition against, or in cooperation with, other players playing at other EGMs, and where at least one action taken by a given player at a given EGM effects at least one outcome for at least one other player at a separate given EGM. One non-limiting example of an online game may be an online poker game, where a plurality of players, each playing on a respective EGM, compete in a common poker game. Each player may be dealt virtual cards from the same virtual deck, and may place bets and receive payouts based not only on his or her interaction with their respective EGM, but also at least in part based on the interaction of each of the other players with their respective EGM.

In certain such online games, each player may be represented by a respective 3D avatar: a given player's 3D avatar may be displayed on each EGM used by other players, and optionally also on the EGM used by the given player. The 3D avatars used by the players in an online game may be any suitable 3D avatar, including any one of the avatars discussed supra. In some embodiments, a given player may be represented by a plurality of 3D avatars, or may be able to change between multiple avatars at any suitable point during the online game. However, for simplicity, the following discussion will discuss each player being represented by a single 3D avatar.

As each player may be represented by a respective 3D avatar when playing the on line game, the EGM 10 at which the player plays may be configured for transmitting the 3D avatar associated with the player of the EGM 10 to all other EGM. Thus, if a group of five players are playing an online game, such as an online poker game, each player may see four 3D avatars, each belonging to a respective other player of the online poker game, and in some embodiments, may additionally see their own respective 3D avatar. To do so, the EGM 10 may be configured for transmitting, over the network, 3D avatar data to the other connected EGM to inform the other connected EGM of the nature of the 3D avatar representing the player.

Figure 7:
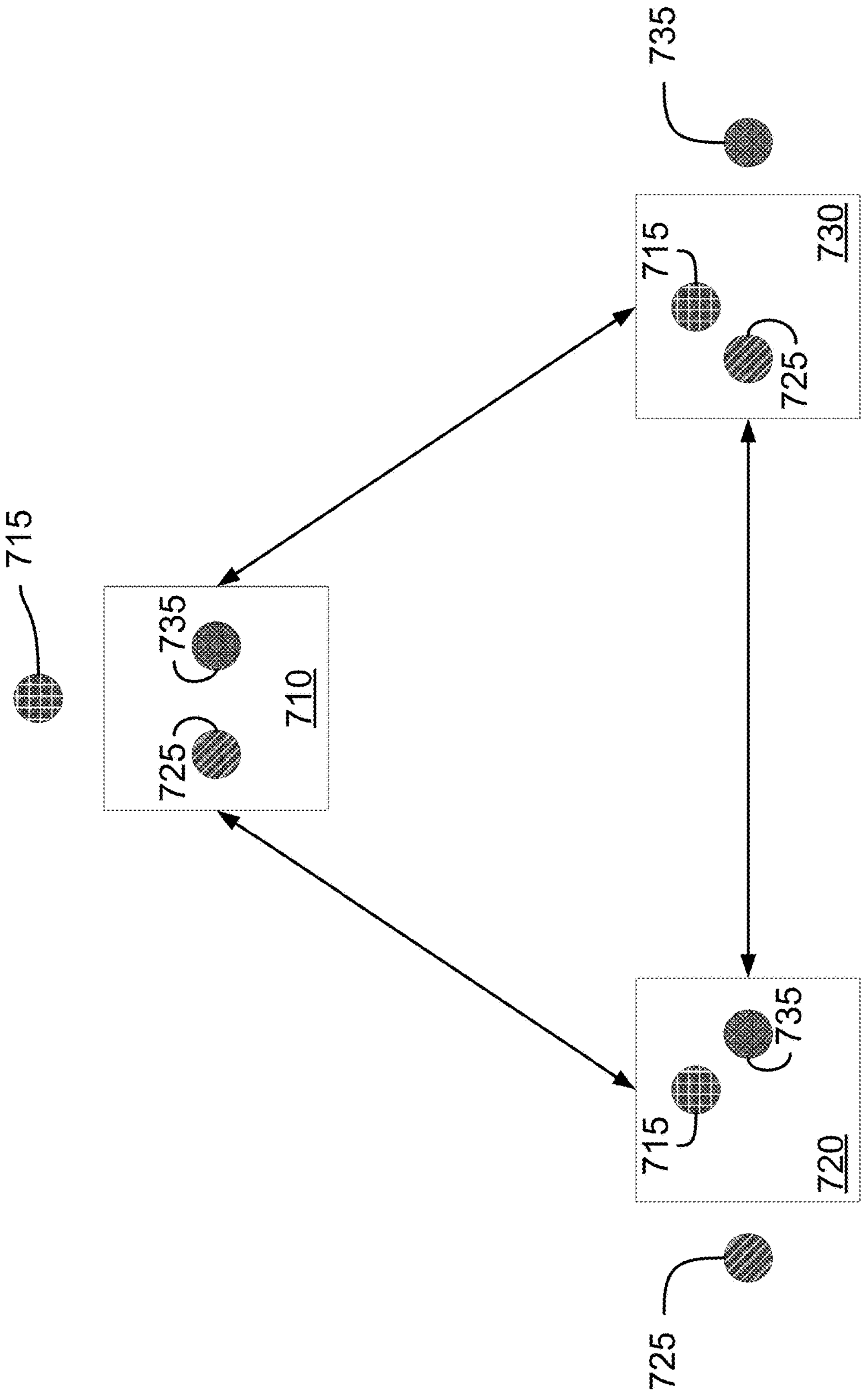
FIG. 7 is a graphical representation of a system of networked electronic gaming machine participating in a common online game.

With reference to FIG. 7, and as mentioned supra, the EGM 10 may also be configured for transmitting avatar movement data to the other connected EGM. Specifically, an example embodiment of an online game with three players is considered. Each player has a respective EGM, namely EGM 710, 720, and 730, and each player is represented by a respective 3D avatar, illustrated by circles 715, 725, and 735, respectively. While FIG. 7 shows the 3D avatars 715, 725, 735 as circles, this is merely for ease of illustration—it should be understood that the 3D avatars used by the players of EGM 710, 720, 730 may be any suitable 3D avatar consistent with those described hereinabove. Each of the EGM 710, 720, 730 may, as discussed supra in relation to FIGS. 5 and 6A-C, acquire and analyze player movement data, and generate avatar movement data. In this embodiment, the EGM 710, 720, 730 may be particularly concerned with generating avatar movement data to cause the 3D avatar 715, 725, 735 to mimic the movements of the player of the EGM 710, 720, 730. For example, the EGM 710 may track at least one eye of the player of the EGM 710 and generate avatar movement data which causes at least one eye of 3D avatar 715 to move in a substantially similar way, such that if the player of the EGM 710 looks at 3D avatar 725, namely the avatar of the player of the EGM 720, the EGM 710 may generate avatar movement data for causing a shift in the gaze of 3D avatar 715 and transmit the avatar movement data to the EGM 720, 730. Optionally, if 3D avatar 715 is displayed on a display unit of the EGM 710, the EGM 710 may also cause movement in the avatar 715 as displayed on the display unit of the EGM 710 in accordance with the avatar movement data.

The particular shift in the gaze of 3D avatar 715 may vary based on a number of factors. For the player playing at EGM 720, if the 3D avatar 725 is displayed by the EGM 720, the EGM 720 may cause movement in the avatar 715 (as displayed by the EGM 720) such that the gaze of the avatar 715 shifts to look at the avatar 725. If the 3D avatar 725 is not displayed by the EGM 720 (i.e., the player of the EGM 720 cannot see his or her own avatar), the EGM 720 may cause movement in the avatar 715 (as displayed by the EGM 720) such that the gaze of the avatar 715 shifts to look at the player of the EGM 720. For the player playing at EGM 730, the EGM 730 may cause movement in the avatar 715 (as displayed by the EGM 730) such that the gaze of the avatar 715 shifts to look at the avatar 725. Other methods of handling the avatar movement data transmitted by the EGM 710 to the EGM 720, 730, are also considered.

In some further embodiments, the EGM 710 may collect player movement data associated with the player of the EGM 710 and, prior to analyzing the player movement data, may cause the player movement data to be transmitted to the EGM 720, 730 over the network. The EGM 710, 720, 730 may then each perform analysis of the player movement data and generate avatar movement data for avatar 715 accordingly. Each of the EGM 710, 720, 730 may then cause movement in the avatar 715 based on the avatar movement data.

Moreover, the avatar movement data may be generated based on other player movement data, including all the embodiments described supra. For example, if the player of the EGM 710 raises their arms, the avatar movement data transmitted by the EGM 710 may be for causing arms of 3D avatar 715 to be raised. Similarly, the EGM 710 may be configured for transmitting avatar movement data for causing 3D avatar 715 to mimic at least one facial expression and/or emotional state of the player of the EGM 710.

The example discussed supra may be implemented by the EGM 710, 720, 730 being connected over a local network, wherein each EGM 710, 720, 730 is connected to each other EGM 710, 720, 730, as illustrated in FIG. 7. In some embodiments, one of the EGM 710, 720, 730 may act as a "host" EGM and may manage the interaction between the EGM 710, 720, 730. Alternatively, the EGM 710, 720, 730 may be connected via a central gaming server (not shown) which may receive avatar movement data (or player movement data) from each of the EGM 710, 720, 730 and cause the avatar movement data (or player movement data) to then be transmitted to those EGM 710, 720, 730 from which the avatar movement data was not received. Additionally, while the present example discussed three EGM 710, 720, 730, it should be understood that any number of EGM may be networked together, and any suitable number of EGM may be used to play an online game together.

Figure 8:
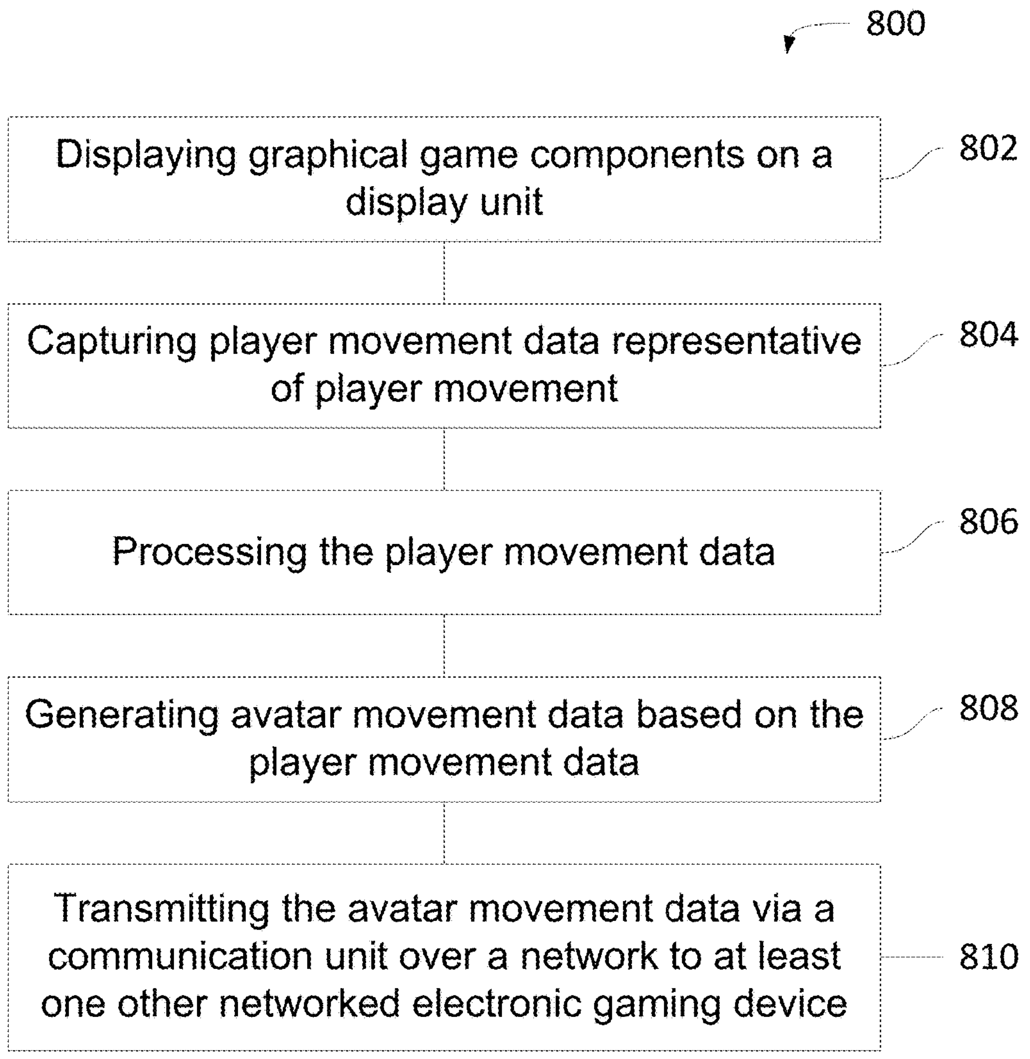
FIG. 8 illustrates a flowchart diagram of an exemplary computer-implemented method for transmitting avatar movement data over a network.

Accordingly, and with reference to FIG. 8, there is provided an exemplary method 800 for transmitting avatar movement data over a network. The method 800 is illustrated as a flowchart, and may be implemented, for example, by the EGM 10 (or any other EGM, including EGM 710, 720, 730).

At step 802, the EGM 10 may display graphical game components on the display unit 12 (or the display unit 14). The graphical game components displayed on the display unit 12 may be any suitable graphical game components as described supra, and may include at least one 3D avatar.

At step 804, the EGM 10 may capture player movement data representative of one or more parameters of movement of the player, including any parameters discussed supra in the context of step 504 of the method 500.

At step 806, the player movement data captured at step 504 may be analyzed by the EGM 10, and more specifically by the game controller board 44. The analysis may be performed in any suitable fashion, including any fashion discussed supra in the context of step 506 of the method 500.

At step 808, the EGM 10 may generate avatar movement data based on the player movement data. More specifically, the EGM 10 may use the analysis performed in step 506 to generate the avatar movement data. The avatar movement data may comprise at least one instruction for causing at least one portion of the at least one 3D avatar to move. The avatar movement data may be generated in substantively the same way as discussed supra in the context of step 508 of the method 500.

At step 810, the EGM 10 may transmit the avatar movement data, via the communication unit, over the network to at least one other networked electronic gaming machine. The EGM 10 may use any suitable protocols or communication methods to transmit the avatar movement data to the at least one other networked electronic gaming machine. In some embodiments, the EGM 10 may use a handshaking protocol to first establish a connection with the at least one other networked electronic gaming machine, whereas in other embodiments the transmission of avatar movement data may be purely ad hoc. Other transmission methods are also considered. The EGM 10 may transmit the avatar movement data directly to the at least one other networked electronic gaming machine, or, as discussed hereinbelow, may make use of the central gaming server.

Figure 9:
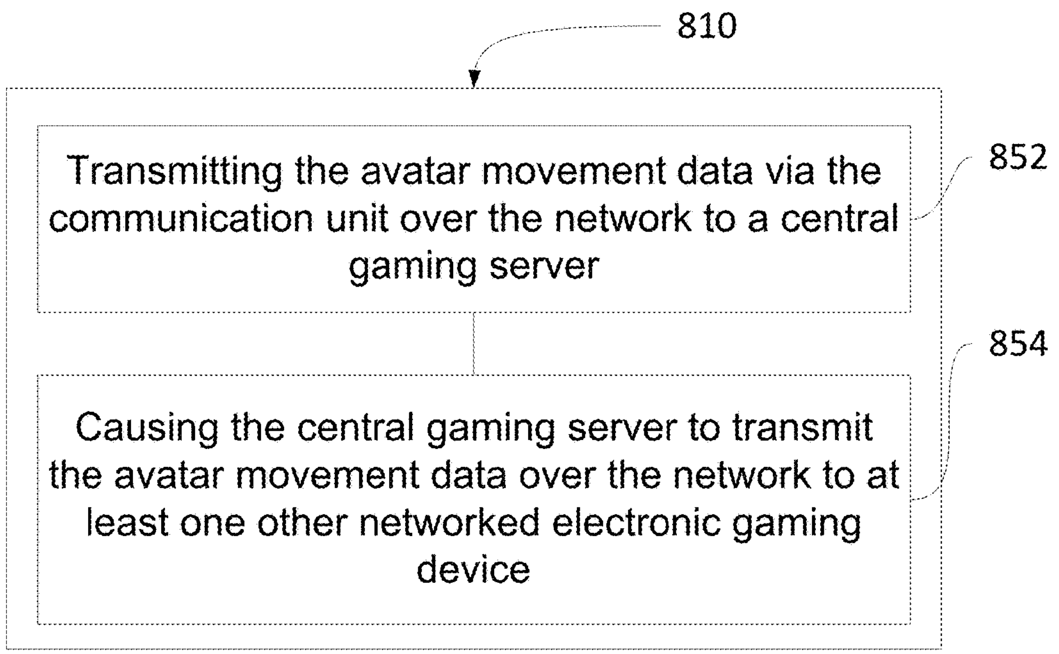
FIG. 9 illustrates a flowchart diagram of an embodiment of step 810 of the method 800 illustrated in FIG. 8.

With reference to FIG. 9, in embodiments where the EGM 10 communicates with the at least one other networked electronic gaming machine via the central gaming server, step 810 of the method 800 may comprise a plurality of substeps. Specifically, step 810 may comprise a first substep 852 where the EGM 10 transmits the avatar movement data, via the communication unit, over the network to the central gaming server. As discussed supra, the central gaming server may be any suitable server which mediates communications between the EGM 10 and the at least one other networked electronic gaming machine. Step 810 may comprise a second substep 854 where the EGM 10 causes the central gaming server to transmit, over the network, the avatar movement data to the at least one other networked electronic gaming machine. The EGM 10 may effect step 854 simply by effecting step 852, where the central gaming server interprets the receipt of avatar movement data from the EGM 10 at step 852 as a request to transmit the avatar movement data to the at least one other networked electronic gaming machine, thereby effecting step 854. Alternatively, or in addition, the EGM 10 may effect step 854 in a separate communication event. In this case, the EGM 10 may first transmit avatar movement data to the central gaming server, and may, at a later time, transmit a request to the central gaming server to cause the central gaming server to transmit the previously sent avatar movement data to the at least one other networked electronic gaming machine. The communication between the EGM 10 and the central gaming server may be effected in any suitable way, using any suitable protocols, including those discussed supra.

In some embodiments, the at least one camera, and the display device 12 (and/or the secondary display device 14) may be calibrated. Calibration of the at least one camera and the display devices 12, 14 may be desirable because the eyes of each player using the electronic gaming machine may be physically different, such as the shape and location of the player's eyes, and the capability for each player to see. Each player may also stand at a different position relative to the EGM 10.

The at least one camera may be calibrated by the EGM 10 by detecting the movement of the player's eyes. In some embodiments, the display controller 52 may control the display devices 12, 14 to display one or more calibration symbols. There may be one calibration symbol that appears on the display devices 12, 14 at one time, or more than one calibration symbol may appear on the display devices 12, 14 at one time. The player may be prompted by text or by a noise to direct their gaze to one or more of the calibration symbols. The at least one camera may monitor the gaze of the player looking at the one or more calibration symbols and a distance of the player's eyes relative to the electronic gaming machine to collect calibration data. Based on the gaze corresponding to the player looking at different calibration symbols, the at least one camera may record player movement data associated with how the player's eyes rotate to look from one position on the display devices 12, 14 to a second position on the display devices 12, 14. The EGM 10 may calibrate the at least one camera based on the calibration data.

Figure 10:
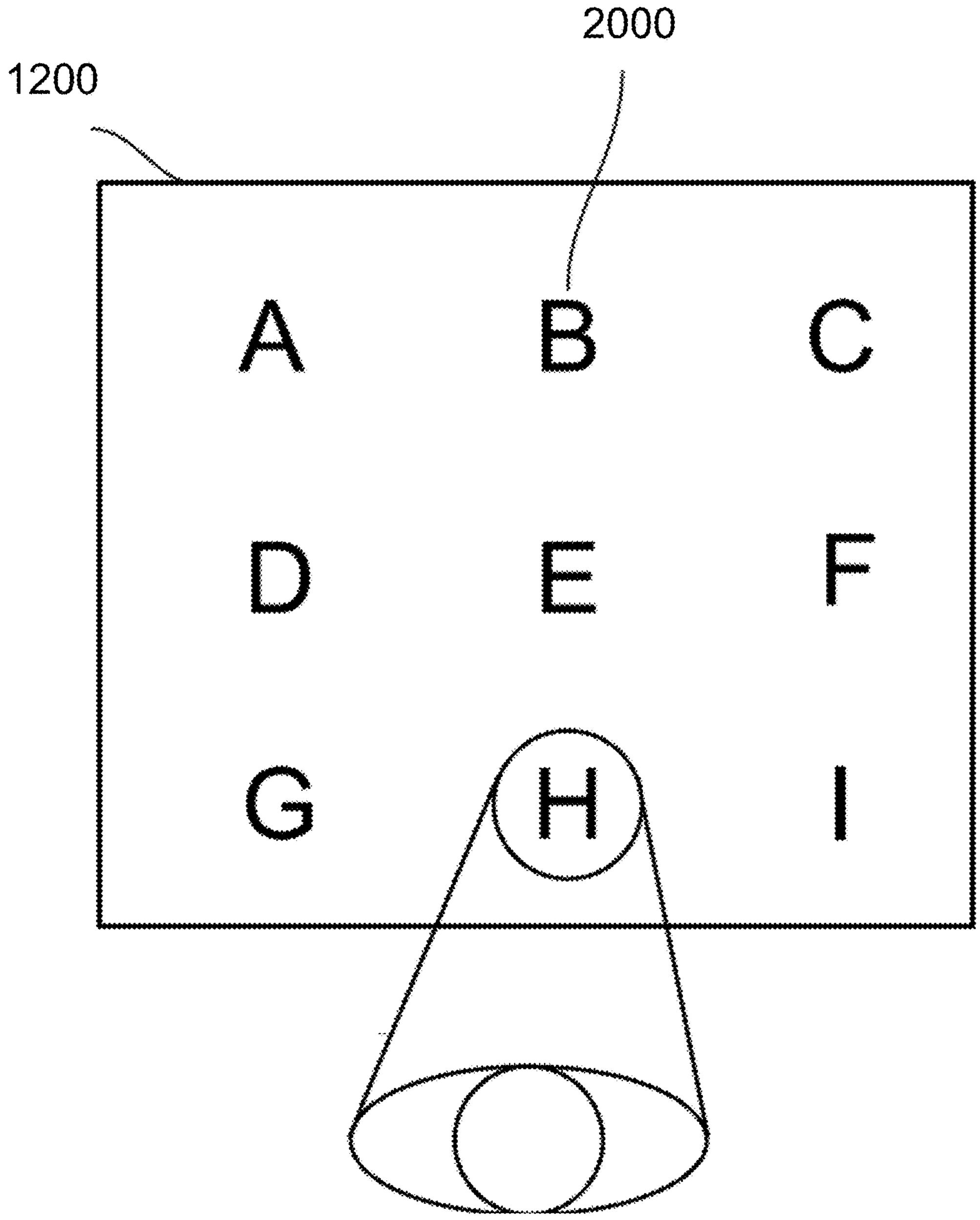
FIG. 10 is a schematic representation of a viewing area including calibration symbols in accordance with some embodiments of the present inventive concept.

For example, as shown in FIG. 10, before the player plays the interactive game, the EGM 10 may notify the player that the at least one camera and the display devices 12, 14 may be calibrated. The display controller 52 may cause the viewing area 1200 to display nine calibration symbols 2000. In FIG. 10, the calibration symbols 2000 are the letters "A" through "I", but the calibration symbols 2000 may be any other symbols. The calibration symbols 2000 may be located on any portion of the display devices 12, 14. The player may be prompted to look at the nine calibration symbols 2000 in a certain order. The at least one camera may monitor the gaze of the player looking at the nine calibration symbols 2000 and the distance of the player's eyes relative to the electronic gaming machine to collect the calibration data. When the at least one camera collects player movement data in real time, the EGM 10 may compare the player movement data with the calibration data in real time to determine the angle at which that the player's eyes are looking.

The display controller 52 may calibrate the display devices 12, 14 using the graphics controller based on the calibration data collected by the at least one camera. The at least one camera may monitor the gaze of the player to collect calibration data as described herein. The display controller 52 may calibrate the display devices 12, 14 using the graphics processor to display a certain resolution on the display devices 12, 14.

Figure 11:
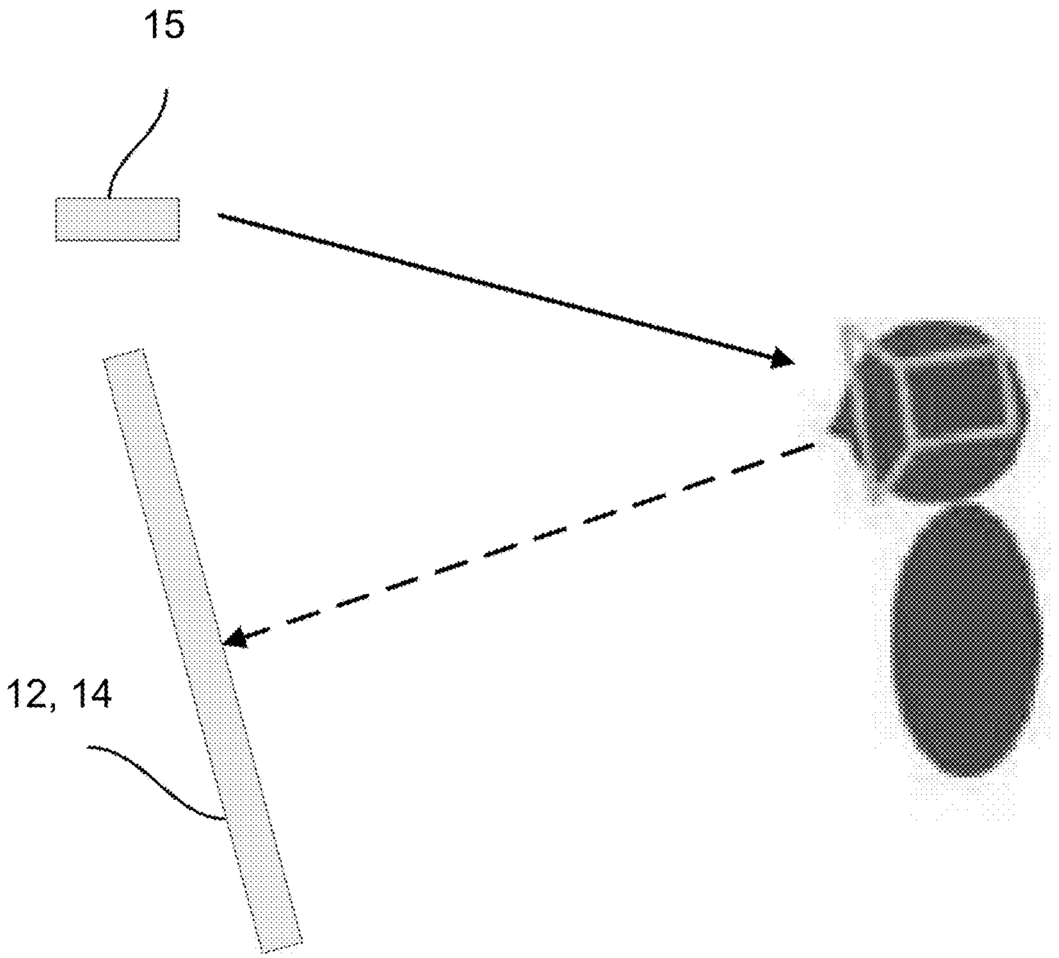
FIG. 11 is a schematic representation of a side view of an arrangement of display devices, a camera and a player in accordance with some embodiments of the present inventive concept.

In some embodiments, the EGM 10 may determine the location of the gaze relative to the viewing area 1200 based on the position of the player's eyes relative to the electronic gaming machine and an angle of the player's eyes. As shown in FIG. 11, the at least one camera, which may be the camera 15, may monitor the position of the player's eyes relative to the electronic gaming machine, and may also monitor the angle of the player's eyes to collect display mapping data. The angle of the player's eyes may be determined based on the calibration of the at least one camera described herein. The angle of the player's eyes may define the focus of the gaze, which may be a line of sight relative to the display devices 12, 14. Based on the position of the player's eyes relative to the electronic gaming machine and an angle of the player's eyes or the line of sight relative to the display devices 12, 14, the EGM 10 may be configured to determine the direction of an array projecting from the player's eyes. The EGM 10 may determine where the array intersects with the display devices 12, 14, and may determine where the gaze of the player is focused on the display devices 12, 14. The EGM 10 may identify coordinates on the display devices 12, 14 corresponding to the player movement data and may map the coordinates to the viewing area 1200 to determine the gaze of the player relative to the viewing area 1200. In some embodiments, the gaze of the player may be expressed in three dimensions, depending on whether the interactive game is a two-dimensional game or a three-dimensional game.

While playing an interactive game on the EGM 10, the eyes of a player may move suddenly without the player being conscious of the movement. The eyes of the player may demonstrate subconscious, quick, and short movements, even if the player is not actively controlling their eyes to move in this manner. These subconscious, quick, and short eye movements may affect the determination of the EGM 10 of the gaze of the player based on the player movement data. Accurate processing of the player movement data related to these subconscious, quick, and short eye movements may result in detecting the location of the gaze of the player representative of eye twitching or erratic eye movements not reflective of the player's intended gaze, and may be distracting to the player. It may be useful for the player movement data to be filtered to not reflect these quick and short eye movements, for example, so the determination of the gaze of the player relative to the display units 12, 14 by the EGM 10 reflects the intended gaze of the player. It may also be useful for the portion of the player movement data representative of the subconscious, quick, and short eye movements to have less determinative effect on the determined location of the gaze of the player. In some embodiments, the EGM 10 may define a filter movement threshold, wherein the EGM 10, prior to determining a location of the gaze of the player relative to the display units 12, 14 using the player movement data collected by the at least one camera and updating the rendering of the display units 12, 14, determines that the player gaze meets the filter movement threshold.

As discussed supra, the at least one camera may collect player movement data. The EGM 10 may process the player movement data to correspond with a location on the viewing area 1200. The EGM 10 may determine where the player is looking at on the viewing area 1200 based on a certain number of previously recorded player movement data, for example, by tracking the last ten gaze positions to average out where on the viewing area 1200 the player is looking. The EGM 10 may limit the amount of previously recorded player movement data that is used to determine where on the viewing area 1200 the player is looking. The EGM 10 may filter out, or "smooth out", player movement data outside of the pre-determined filter movement threshold, which may represent sudden and subconscious eye movement. The EGM 10 may map the gaze of the player to the viewing area 1200 using at least a portion of the filtered player movement data to determine the location of the viewing area 1200 at which the player is looking, in order to map the player's gaze to the viewing area 1200. As another example, the EGM 10 may delay in processing the player movement data associated with subconscious, quick, and short eye movements, so the detected location of the gaze of the player does not represent twitching or sudden unconscious eye movements. Large eye motions may also be associated with more delay in processing and more smoothing. In some embodiments, the EGM 10 may partition the player movement data associated with large eye motions into data representative of shorter eye motions. The EGM 10 may analyze the player movement data to determine which player movement data is associated with subconscious eye movement or with conscious eye movement based on a filter movement threshold, a time threshold, movement threshold, or any combination thereof. Player movement data associated with quick eye movements over a certain period of time may be determined by the EGM 10 to be subconscious eye movement. The EGM 10 may delay in processing this portion of player movement data so the detected location of the eye gaze of the player may be stable and may not distract the player, or the EGM 10 may filter out this player movement data and not process it. Player movement data associated with large eye movements over a certain period of time may be determined by the EGM 10 to be the player losing focus or being distracted. The EGM 10 may similarly delay in processing this portion of player movement data or not process this portion of player movement data. In some embodiments, EGM 10 may filter out, or "smooth out" player movement data that may exceed the filter movement threshold, in the manner described herein.

The locations where EGM 10 may be used may have a variety of lighting conditions. For example, EGM 10 may be used in a restaurant, a hotel lobby, an airport, and a casino. It may be brighter in some locations and darker in other locations, or the light quality may fluctuate from brightness to darkness. In some embodiments, EGM 10 may include an infrared light source that illuminates the player. The infrared light sources may not interfere with the eyes of the player. In some embodiments, the at least one camera may be an infrared camera. The infrared camera may collect player movement data without being affected by the lighting conditions of the locations where EGM 10 may be used. In some embodiments, EGM 10 may have a plurality of light sources providing a plurality of spectra of light, and the at least one camera may be a plurality of cameras configured to detect a plurality of spectra of light, so the at least one camera may collect player movement data without being affected by the lighting conditions of the locations where EGM 10 may be used.

A player that plays an interactive game using EGM 10 may be wearing glasses. The glasses of the player may cause refractions and/or reflections of the light that illuminates the player. This may affect the at least one camera while it monitors the gaze, eye gesture, and/or movement of the player. Glasses that comprise an infrared filter may also interfere with or affect the at least one camera while it monitors the gaze, eye gesture, and/or movement of the player. EGM 10 may recognize that the player may be wearing glasses. For example, as the interactive game commences, display controller 52 may display on display devices 12, 14 using graphics processor a question asking the player if he or she is wearing glasses. The player may provide input indicating whether he or she is wearing glasses, such as, but not limited to, with an audio command, touch command, or with the player's gaze. As other example, the EGM 10 may recognize, based on processing the player movement data from the at least one camera, that the light illuminating the player may be refracted, and may determine that the player is wearing glasses. When EGM 10 recognizes that the player may be wearing glasses, the EGM 10 may perform additional and/or more stringent filtering functions as described herein to compromise for the player's use of glasses and to accommodate the refractions of the light that illuminates the player. For example, the filter movement threshold may be set to be higher for players who wear glasses.

The game may be played on a standalone video gaming machine, a gaming console, on a general purpose computer connected to the Internet, on a smart phone, or using any other type of gaming device. The video gaming system may include multiplayer gaming features.

The game may be played on a social media platform, such as Facebook™. The video gaming computer system may also connect to a one or more social media platforms, for example to include social features. For example, the video gaming computer system may enable the posting of results as part of social feeds. In some applications, no monetary award is granted for wins, such as in some on-line games. For playing on social media platforms, non-monetary credits may be used for bets and an award may comprise similar non-monetary credits that can be used for further play or to have access to bonus features of a game. All processing may be performed remotely, such as by a server, while a player interface (computer, smart phone, etc.) displays the game to the player.

The functionality described herein may also be accessed as an Internet service, for example by accessing the functions or features described from any manner of computer device, by the computer device accessing a server computer, a server farm or cloud service configured to implement said functions or features.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. A processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including an EGM, A Web TV, a Personal Digital Assistant (PDA), a smart phone, a tablet or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, a computer may receive input information through speech recognition or in other audible formats.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the enhancements to game components may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods as described herein need not reside on a single computer or processor, but may be distributed in a modular fashion amongst a number of different computers or processors to implement various aspects.

Computer-executable instructions may be in many forms, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present game enhancements may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. While particular embodiments have been shown and described, it will be obvious to those skilled in the art that changes and modifications may be made without departing from this invention in its broader aspects. The appended claims are to encompass within their scope all such changes and modifications.

The invention claimed is:

1. An electronic gaming machine, comprising:

at least one data storage unit to store game data for a game played by a player and comprising wagering and payout elements;

a display unit to display, via a graphical user interface, graphical game components, including at least one avatar, in accordance with the game data;

at least one data capture unit to collect player movement data representative of movement of at least one eye of the player, the data capture device comprising a camera; and at least one processor, configured to:

analyze the player movement data;

generate avatar movement data based at least in part on the player movement data, the avatar movement data comprising instructions for causing at least one portion of the at least one avatar to move;

cause movement of the at least one portion of the at least one avatar on the display unit based on the avatar movement data; and predictively generate avatar movement data based on previously acquired player movement data.

2. The electronic gaming machine of claim 1, wherein the player movement data is indicative of a gaze of the player, and wherein the avatar movement data comprises instructions for causing at least one portion of the at least one avatar to follow the gaze of the player.

3. The electronic gaming machine of claim 2, wherein the at least one portion of the at least one avatar comprises at least one eye of the at least one avatar.

4. The electronic gaming machine of claim 1, wherein the player movement data is further representative of movement of a head of the player, and wherein the at least one portion of the at least one avatar comprises at least a head of the at least one avatar.

5. The electronic gaming machine of claim 1, wherein the at least one processor configured to analyze the player movement data is further configured for analyzing at least one facial expression of the player to determine, for each of the at least one facial expression, a respective emotional state of the player.

6. The electronic gaming machine of claim 5, wherein the at least one processor configured to generate the avatar movement data is further configured to generate the avatar movement data based on the at least one facial expression of the player.

7. The electronic gaming machine of claim 6, wherein the avatar movement data comprises instructions for causing the at least one avatar to mimic the at least one facial expression of the player.

8. The electronic gaming machine of claim 6, wherein the avatar movement data comprises instructions for causing the at least one avatar to adopt a facial expression complementary to the at least one emotional state of the player.

9. The electronic gaming machine of claim 1, wherein the at least one processor configured to analyze the player movement data is further configured to cause the avatar to exhibit idle animations that are generated when no avatar movement data has been generated.

10. A networked electronic gaming machine, comprising:

at least one data storage unit to store game data for a game played by a player and comprising wagering and payout elements;

a display unit to display, via a graphical user interface, graphical game components in accordance with the game data;

a communication unit for communicating, over a network, with at least one other networked electronic gaming machine;

at least one data capture unit to collect player movement data representative of movement of at least one eye of the player, the data capture device comprising a camera; and at least one processor, configured to:

analyze the player movement data;

generate avatar movement data based on the player movement data, the avatar movement data comprising instructions for causing at least one portion of at least one avatar to move; and transmit, via the communication unit, the avatar movement data over the network to the at least one other networked electronic gaming machine, the avatar movement data causing movement of the at least one portion of the at least one avatar on a display unit of the at least one other networked electronic gaming machine.

11. The networked electronic gaming machine of claim 10, wherein the graphical game components comprise the at least one avatar, and wherein the processor is further configured to cause movement of the at least one portion of the at least one avatar on the display unit based on the avatar movement data.

12. The networked electronic gaming machine of claim 10, wherein the player movement data is indicative of a gaze of the player, and wherein the avatar movement data comprises instructions for causing at least one portion of the at least one avatar to follow the gaze of the player.

13. The electronic gaming machine of claim 12 wherein the at least one portion of the at least one avatar comprises at least one eye of the at least one avatar.

14. The electronic gaming machine of claim 10, wherein the player movement data is further representative of movement of a head of the player, and wherein the at least one portion of the at least one avatar comprises at least a head of the at least one avatar.

15. The electronic gaming machine of claim 10, wherein the at least one processor configured to analyze the player movement data is further configured for analyzing at least one facial expression of the player to determine, for each of the at least one facial expression, a respective emotional state of the player.

16. The electronic gaming machine of claim 15, wherein the at least one processor configured to generate the avatar movement data is further configured for generating the avatar movement data based on the at least one facial expression of the player.

17. The electronic gaming machine of claim 16, wherein the avatar movement data comprises instructions for causing the at least one avatar to mimic the at least one facial expression of the player.

18. The electronic gaming machine of claim 17, wherein the avatar movement data comprises instructions for causing the at least one avatar to adopt a facial expression complementary to the at least one emotional state of the player.

19. A networked electronic gaming machine, comprising:

at least one data storage unit to store game data for a game played by a player and comprising wagering and payout elements;

a display unit to display, via a graphical user interface, graphical game components, including at least one avatar, in accordance with the game data;

a communication unit for communicating, over a network, with at least one other networked electronic gaming machine;

at least one processor, configured to:

receive, via the communication unit, avatar movement data over the network from at least one further networked electronic gaming machine, the avatar movement data being based at least in part on player movement data representative of movement of at least one eye of a player of the at least one further networked electronic gaming machine and comprising instructions for causing at least one portion of the at least one avatar to move; and cause movement of the at least one portion of the at least one avatar on the display unit based on the avatar movement data.

20. The networked electronic gaming machine of claim 19, wherein the avatar movement data is further based at least in part on at least one of a facial expression and one emotional state of the player of the at least one further networked electronic gaming machine.

* * * * *